(12) United States Patent
Kim et al.

(10) Patent No.: US 11,592,198 B2
(45) Date of Patent: Feb. 28, 2023

(54) AIR PURIFIER

(71) Applicant: LG Electronics Inc., Seoul (KR)

(72) Inventors: Sukchun Kim, Seoul (KR); Myungjin Ku, Seoul (KR); Taeyoon Kim, Seoul (KR); Kunyoung Lee, Seoul (KR); Hyunpil Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 16/253,772

(22) Filed: Jan. 22, 2019

(65) Prior Publication Data
US 2019/0226696 A1    Jul. 25, 2019

(30) Foreign Application Priority Data

Jan. 19, 2018 (KR) .................. 10-2018-0007385
Mar. 5, 2018 (KR) .................. 10-2018-0026003
Nov. 1, 2018 (KR) .................. 10-2018-0133153

(51) Int. Cl.
| | |
|---|---|
| *F24F 8/00* | (2021.01) |
| *F24F 8/80* | (2021.01) |
| *F24F 13/20* | (2006.01) |
| *F24F 13/28* | (2006.01) |
| *F24F 6/04* | (2006.01) |

(Continued)

(52) U.S. Cl.
CPC ............ *F24F 8/80* (2021.01); *F24F 6/04* (2013.01); *F24F 6/12* (2013.01); *F24F 8/125* (2021.01); *F24F 11/52* (2018.01); *F24F 13/20* (2013.01); *F24F 13/28* (2013.01); *F24F 8/117* (2021.01); *F24F 2006/008* (2013.01); *F24F 2221/36* (2013.01)

(58) Field of Classification Search
CPC ...... F24F 6/12; F24F 6/04; F24F 11/52; F24F 3/16; F24F 2006/008; F24F 2221/36; F24F 8/117
USPC ............................................ 96/294
See application file for complete search history.

(56) References Cited

U.S. PATENT DOCUMENTS 3,610,589 A  * 10/1971  Paulin .................. F24F 6/06
                                                     261/150
3,616,624 A  * 11/1971  Marsh ................. F24F 3/16
                                                     55/482

(Continued)

FOREIGN PATENT DOCUMENTS

| CN | 203274184 | 11/2013 |
| CN | 204519811 | 8/2015 |

(Continued)

OTHER PUBLICATIONS

Indian Office Action dated Jun. 30, 2020.

(Continued)

*Primary Examiner* — T. Bennett McKenzie
(74) *Attorney, Agent, or Firm* — Birch, Stewart, Kolasch & Birch, LLP

(57) ABSTRACT

A humidifying air purifier includes a door assembly supported and configured to be selectively drawn out of a front side of a cabinet and drawn into the front side of the cabinet to respectively open and close an inner portion of the cabinet. The door assembly includes an accommodation portion configured to support an air filter and a humidifying device which are both drawn out of and into the humidifying air purifier with the door assembly.

15 Claims, 17 Drawing Sheets

(51) Int. Cl.
*F24F 8/125* (2021.01)
*F24F 11/52* (2018.01)
*F24F 6/12* (2006.01)
*F24F 8/117* (2021.01)
*F24F 6/00* (2006.01)

(56) References Cited

U.S. PATENT DOCUMENTS

| | | | | |
|---|---|---|---|---|
| 4,234,526 A | * | 11/1980 | Mackay | F24F 6/04 261/106 |
| 4,737,173 A | * | 4/1988 | Kudirka | F24F 8/10 96/131 |
| 4,753,496 A | * | 6/1988 | Bussard | F24F 7/065 312/236 |
| 4,953,991 A | * | 9/1990 | Rock | A47B 88/43 384/22 |
| 5,676,438 A | | 10/1997 | Jeong | |
| 5,893,939 A | | 4/1999 | Rakocy et al. | |
| 6,705,535 B1 | * | 3/2004 | Morton | F24F 6/18 237/78 R |
| 2005/0258331 A1 | | 11/2005 | Chi | |
| 2006/0016337 A1 | * | 1/2006 | Taylor | B03C 3/08 96/25 |
| 2006/0021359 A1 | | 2/2006 | Hur | |
| 2006/0278084 A1 | | 12/2006 | Kim | |
| 2009/0096118 A1 | * | 4/2009 | Brown | F24F 6/04 261/142 |
| 2010/0143125 A1 | | 6/2010 | Vogel et al. | |
| 2011/0291305 A1 | | 12/2011 | Choi et al. | |
| 2012/0164935 A1 | | 6/2012 | Ha et al. | |
| 2013/0206009 A1 | | 8/2013 | Huang et al. | |
| 2013/0222672 A1 | | 8/2013 | Kim et al. | |
| 2013/0235518 A1 | * | 9/2013 | Kuo | F24F 5/0017 361/679.32 |
| 2015/0084215 A1 | * | 3/2015 | Ojeda | F24F 6/00 261/71 |
| 2015/0125292 A1 | * | 5/2015 | Karst | F04D 29/602 29/889.3 |
| 2015/0292508 A1 | | 10/2015 | Ikeda et al. | |
| 2016/0010882 A1 | | 1/2016 | Lee et al. | |
| 2016/0108822 A1 | | 1/2016 | Lee | |
| 2016/0052095 A1 | | 2/2016 | Simmons | |
| 2016/0212874 A1 | | 7/2016 | Ogawa | |
| 2017/0122594 A1 | | 5/2017 | Lee et al. | |
| 2018/0187908 A1 | | 7/2018 | Brendel | |
| 2019/0072293 A1 | * | 3/2019 | Kim | F24F 13/22 |

FOREIGN PATENT DOCUMENTS

| | | |
|---|---|---|
| JP | H07120006 | 5/1995 |
| JP | H0810544 | 1/1996 |
| JP | 2002-291549 | 10/2002 |
| JP | 2004347211 | 12/2004 |
| JP | 2008-95988 | 4/2008 |
| JP | 2009-36401 | 2/2009 |
| JP | 2010-84992 | 4/2010 |
| JP | 2011-58661 | 3/2011 |
| JP | 2013-26623 | 2/2013 |
| JP | 2014-66399 | 4/2014 |
| JP | 5842962 | 11/2015 |
| JP | 2016-114302 | 6/2016 |
| JP | 2016211849 | 12/2016 |
| JP | 2017-12326 | 1/2017 |
| JP | 2017062092 | 3/2017 |
| JP | 2017062092 A * | 3/2017 |
| JP | 3214558 U | 1/2018 |
| KR | 1997-0002811 | 3/1995 |
| KR | 20-1997-0002811 | 8/1999 |
| KR | 10-0485578 | 4/2005 |
| KR | 20-0419443 | 6/2006 |
| KR | 10-2006-0111037 | 10/2006 |
| KR | 20060111037 A * | 10/2006 |
| KR | 20060111037 A * | 10/2006 |
| KR | 10-0766430 | 10/2007 |
| KR | 10-2008-0055018 | 6/2008 |
| KR | 10-2008-0055457 | 6/2008 |
| KR | 10-2010-0077951 | 7/2010 |
| KR | 10-2012-0032393 | 4/2012 |
| KR | 10-2012-0071991 | 7/2012 |
| KR | 10-1225981 | 1/2013 |
| KR | 10-2014-0028586 | 3/2014 |
| KR | 20140073326 | 6/2014 |
| KR | 10-2015-0146185 | 12/2015 |
| KR | 20150146185 A * | 12/2015 |
| KR | 10-2016-0006268 | 1/2016 |
| KR | 10-1619719 | 5/2016 |
| KR | 10-2016-0063844 | 6/2016 |
| KR | 10-2016-0144678 | 12/2016 |
| KR | 10-2017-0051276 | 5/2017 |
| KR | 10-1769817 | 8/2017 |
| KR | 10-2018-0003001 | 1/2018 |
| KR | 10-2013-0127093 | 1/2020 |

OTHER PUBLICATIONS

Indian Office Action dated Oct. 29, 2020.
Korean Notice of Allowance dated Aug. 19, 2020.
Indian Office Action dated Apr. 4, 2021 in Application No. 201914001962.
Office Action dated Jul. 29, 2021 in U.S. Appl. No. 16/253,813.
Korean Notice of Allowance dated Oct. 16, 2020.

* cited by examiner

AIR PURIFIER

CROSS-REFERENCE TO RELATED APPLICATIONS

The present application claims the benefit of priority under 35 U.S.C. 119 and 35 U.S.C. 365 to Korean Patent Application No. 10-2018-0007385 (filed on Jan. 19, 2018), No. 10-2018-0026003 (filed on Mar. 5, 2018) and No. 10-201 8-0133153 (filed on Nov. 1, 2018), the contents of all of which are hereby incorporated by reference in their entireties.

BACKGROUND

The present invention relates to a humidifying air purifier capable of performing air purification and air humidification.

The air purifier is understood as a device which draws in contaminated air to purify the contaminated air, and then discharges the purified air. For example, the air purifier may include an air blowing device which introduces outside air into the inner portion of the air purifier, and a filter which is capable of filtering dust, germs, and the like in the air.

In recent years, an air purifier designed to recognize the air purifier as one kind of furniture and emphasize the harmony between the air purifier and the surrounding furniture has been developed. Particularly, in a case where an air purifier is provided in a bedroom, an air purifier is proposed in which an outer appearance panel thereof is made of wood material with an emphasis on harmony with a wardrobe or a bed.

The air purifier may include a drawer-type door similar to general furniture, and the door may be opened and the internal components of the air purifier can be cleaned or replaced.

With respect to such a drawer-type air purifier, the following related art document 1 is disclosed.

1. Patent registration number (Registration date): 10-0485578 (Apr. 18, 2005)
2. Title of invention: Air purifier According to the related art document 1 as described above, the following problems may exist.

First, the air purifier of the related art document 1 includes an air blowing portion, a filter portion, and an intake opening/closing portion so as to be arranged vertically and installed in separate drawers. Therefore, there is a disadvantage that the user has to open all of the drawers in order to access the inner portion of the air purifier.

Second, since the relatively heavy air blowing portion is stacked on the filter portion and the intake opening/closing portion, deformation of the lower drawer in which the filter portion or the intake opening/closing portion is installed can be caused.

Meanwhile, with respect to the drawer-type air purifier, the following related art document 2 is disclosed.

1. Utility model registration number (registration date): 20-0419443 (Jun. 14, 2006)
2. Title of Utility model: Drawer-type air purifier According to the related art document 2 as described above, the following problems may exist.

First, the air purifier of the related art document 2 is constructed such that an inlet for introducing air is formed on a rear surface and a bottom surface of a main body. In a case of an air purifier having an outer appearance such as a piece of furniture, it is often disposed adjacent to a wall surface (rear surface or side surface) of the room. Accordingly, in a case where the inlet is formed on the rear surface of the main body and in a case where the space between the main body and the wall surface is too narrow and the inlet is formed on the bottom surface of the main body, the space between the main body and the bottom surface is too narrow, so that the intake performance may be deteriorated.

Second, a filter and a driving fan are installed together in the inner space of the drawer. In this case, when the user draws out the drawer to replace or clean the filter, there is a difficulty that a relatively heavy driving fan has to be also drawn out together with the drawer.

Meanwhile, in recent years, a humidifying air purifier has been developed which adds a humidification function to the air purifier.

With respect to such a humidifying air purifier, the following related art document 3 is disclosed.

1. Japanese Patent Registration Number (Registration Date): JP No. 5,842,962 (Nov. 27, 2015)
2. Title of invention: Air purifier According to the related art document 3 as described above, the following problems may exist.

First, in the air purifier of the related art document 3, the air blower, the air purifying filter, and the humidifying unit are stacked from the lower portion of the air purifier toward the upper portion thereof in the vertical direction. The air purifying filter and the humidifying unit are components that the user needs to periodically clean or replace, and according to the above structure, it is troublesome and difficult to separate the air purifying filter or the humidifying unit.

Second, since the humidifying unit is disposed above the air blower and the air purifying filter, water present in the humidifying unit can be dropped and flow into the blower or the air purifying filter. In this case, the performance of the air blower or the air purifying filter may be deteriorated or failure thereof may occur.

SUMMARY

The present invention has been made to solve the above problems and an objective of the present invention is to provide a humidifying air purifier which can easily provide access to the inner portion of the humidifying air purifier by providing a door configured to open like a pull-out drawer.

In addition, another objective of the present invention is to provide a humidifying air purifier in which a water container and a filter are disposed on the door so that the user can easily access the water container and the filter by drawing the drawer-type door out from the humidifying air purifier once.

In addition, another objective of the present invention is to provide a humidifying air purifier capable of drawing in air from a lower front portion of a cabinet to improve air intake performance.

In addition, another objective of the present invention is to provide a humidifying air purifier capable of improving the filtering performance of air by installing an air filter on a back surface of the door so that the air being drawn into the humidifying air purifier can pass through the entire area of the air filter.

In addition, another objective of the present invention is to provide a humidifying air purifier capable of increasing user convenience by providing a guide structure for mounting an air filter.

In addition, another objective of the present invention is to provide a humidifying air purifier provided with a humidifying filter on the outlet side of the air filter configured to readily humidify the purified air.

In addition, another objective of the present invention is to provide a humidifying air purifier in which an air blowing fan is secured to an inner portion of a cabinet, thereby making it difficult for a user to access the air blowing fan even when the door is opened, thereby ensuring stability and safety.

In addition, another objective of the present invention is to provide a humidifying air purifier capable of utilizing an upper surface portion area of the humidifying air purifier as a storage portion.

In addition, another objective of the present invention is to provide a humidifying air purifier in which an outer appearance panel thereof is made of wood material and may have aesthetics similar to furniture.

In order to accomplish the above objective, a humidifying air purifier according to an embodiment of the present invention includes a drawer-type door assembly which can be drawn out of the cabinet in a forward direction from a front side of the cabinet. Accordingly, access to an inner portion of the cabinet can be easily provided by pulling out the door assembly from the front side of the cabinet.

The door assembly includes a door in the form of a drawer which accommodates an air filter and a humidifying device. When the door assembly is drawn out from the cabinet of the humidifying air purifier the air filter and the humidifying device accommodated in the door may be drawn out together.

In addition, the door assembly is installed and adapted to be drawn out of the cabinet or re-inserted into the cabinet. As one example, a humidifying air purifier according to an embodiment of the present invention includes a cabinet in which a front surface opening is formed; a door assembly into which an air filter assembly and a humidifying filter assembly positioned behind the air filter assembly are inserted; and a rail assembly which connects the door assembly with the cabinet so the door assembly can be drawn out of the front surface opening of the cabinet along the rail assembly or pushed back into the front surface opening of the cabinet along the same rail assembly.

The door assembly is formed with an intake through which air is introduced into the cabinet.

The air filter and the humidifying device may be disposed such that the air sucked through the intake passes through the air filter and the humidifying device in turn.

The intake, the air filter, and the humidifying device may be successively aligned in the front to rear direction of the door assembly in an accommodation portion of the door assembly.

The intake may be formed on a bottom surface of the door.

In addition, the intake may be formed on a front surface of the door panel.

In addition, a recessed portion defined as a space between a lower portion of the door assembly and a base may be provided, and the intake may be positioned above the recessed portion. Therefore, the air which has flowed through the recessed portion can be drawn into the door through the intake.

The air having passed through the intake may pass through an air filter which is seated in an air filter seating portion of the door. The air having passed through the air filter may pass through a humidifying device including a humidifying filter.

The door may be configured such that the air filter seating portion and a water tub seating portion extend in a front and rear direction.

The water tub seating portion is recessed more than the air filter seating portion, and thus the installation position of the water tub can be lowered.

The air filter may be supported by a door assembly.

The upper portion of the air filter is disposed obliquely forward to facilitate attachment and detachment of the air filter. Thus, an upper portion of the air filter assembly is disposed to incline forwardly.

The door is provided with a guide structure for guiding the mounting of the air filter. Therefore, it is easy to attach and detach the air filter to the correct position. It is also possible to prevent the air filter from shaking. For example, a door side surface portion is provided with a guide rib which contacts a mounting protrusion of the air filter, and the upper surface portion of the door is provided with a mounting groove to which the insertion protrusion of the air filter is coupled.

A centrifugal fan is installed on an outlet side of the humidifying device.

The air blowing fan may be installed on the rear side of the humidifying device, and the air passing through the air blowing fan may pass through a rear upper portion of the upper panel.

The cabinet may be formed of a plurality of panel assemblies and a base.

The base may include a first base, a base connecting portion extending upward from a rear side of the first base, and a second base extending rearward from the base connecting portion.

The panel assembly may include a side panel extending upward from both sides of the base and an upper panel disposed on an upper side of the side panel.

A door panel that forms an outer appearance surface of the door may be provided removably in front of the panel assembly. The door may be coupled to the door panel. There, the door is supported by the second base and is taken out of the inner portion of the panel assembly.

In another point of view, the humidifying air purifier according to the embodiment of the present invention can be formed into a furniture shape so that the outer appearance of the humidifying air purifier can maintain a sense of unity with the furniture used for indoor living. Accordingly, the outer appearance of the cabinet and the door assembly removably installed in the cabinet may be formed of wood material.

The cabinet may include a body frame opened forward and forming a basic body, a side panel coupled to both side surfaces of the body frame, and an upper panel connecting the two side panels from above the side panel.

The body frame may include a bar defining an opening on the front surface.

The door assembly may include a drawer installed to be drawn out in the opening direction of the body frame.

The door assembly may further include a door panel which forms an outer appearance of a front surface of the drawer. The door panel may be coupled to the front surface of the drawer.

At least one of the door panel, the two side panels, and the upper panel may be formed of wood material. Accordingly, it is possible to provide a uniformly aesthetic appearance so that the user can recognize the humidifying air purifier as one kind of indoor furniture.

In one embodiment of the humidifying air purifier formed of the wood material, a plurality of grooves may be formed to prevent deformation, breakage, or the like of the wood material. As one example, at least one of the door panel, the side panel, and the upper panel may be formed with a wooden groove formed in a straight line on the inner surface thereof.

In addition, in an embodiment of the humidifying air purifier formed of the wood material, metal for improving durability can be inserted therein. As an example, at least one of the door panel, the side panel, and the upper panel may have a metal reinforcing frame inserted into the inner surface thereof.

The outer appearance of the humidifying air purifier may be provided to form a sense of unity. As one example, the door panel may have a size corresponding to an area defined by a front end of the upper panel and front ends of the two side panels.

In addition, both side ends of the door panel can be in contact with the inner surfaces of the two side panels. Accordingly, the door assembly can be completely formed as one body in a state where the door assembly is drawn into the cabinet.

In another point of view, the humidifying air purifier according to the embodiment of the present invention may include a door assembly provided as a drawer-type door assembly mounted inside the cabinet. In other words, the door assembly is detachably provided in the cabinet and may form a flow path for air.

Accordingly, in a case where the door assembly is completely drawn into the cabinet, the door assembly and the open portion of the cabinet can provide a sealing structure so that the incoming air can follow the intended flow path.

The humidifying air purifier of the present invention can provide a double sealing structure with respect to air flow passing through the air purifier.

The humidifying air purifier may include a body frame having a first side surface, a second side surface, and a bar coupled to front ends of the two side surfaces to define a front surface opening. In addition, the humidifying air purifier may include a first side panel coupled to the first side surface and extending forwardly of the bar; and a second side panel coupled to the second side surface and extending forwardly of the bar.

Also, a sealing frame, which is in contact or close contact with the front surface of the bar and the side surfaces of the first side panel and the second side panel, is provided. A door panel for covering the front surface opening is coupled to the front surface of the sealing frame.

In addition, a drawer provided to be drawn out of the front surface opening is coupled to the door panel.

A suction port (or intake) through which air is sucked may be formed on the bottom surface of the drawer. The air filter assembly is installed in the drawer so as to be positioned on the rear side of the suction port.

The sealing frame may be positioned below the upper end of the door panel.

The door panel may have a circumference larger than the circumference of the sealing frame.

The lower end portion of the sealing frame may be positioned below the intake or at both ends of the front area of the intake. A lower end portion of the sealing frame may form an incision space.

The sealing frame may include a first end portion and a second end portion which extend from the lower ends of both sides thereof to face each other. The space between the first end portion and the second end portion may communicate with the intake.

The first end portion and the second end portion may be spaced apart from each other in directions facing each other.

The bar of the body frame may be formed in a shape corresponding to the sealing frame.

The incision space formed by the lower end portion of the bar of the body frame and the lower end portion of the sealing frame may form a portion of the intake.

The sealing frame may further include a sealing member inserted into the sealing frame.

In a case where the drawer is drawn into the body frame, the rear surface of the sealing frame can be brought into close contact with the front surface of the bar. In a case where the drawer is drawn into the body frame, the side surface of the sealing frame may be in close contact with the first side panel or the second side panel.

In addition, in a case where the drawer is drawn into the body frame, at least two surfaces of the outer surfaces of the sealing frame may be in close contact with at least one of the bar, the first side panel, and the second side panel so as to seal the front surface opening.

In addition, the first side panel may be coupled to the outside of the first side surface, and the second side panel may be coupled to the outside of the second side surface.

In addition, sliding rails may be installed on both lower ends of the body frame. Rail guides for coupling with the sliding rail may be installed at both lower ends of the drawer.

The sliding rail may be positioned above the lower end portion of the bar of the body frame.

The lower end of the bar of the body frame and the lower end portion of the sealing frame may be in close contact with or separated from each other in the front and rear direction.

The upper end of the door panel may be spaced forward from the front end of the upper panel to form a display groove. A display having an input unit may be positioned in the display groove.

In another point of view, there is provided a humidifying air purifier according to an embodiment of the present invention in which a door provided to be capable of being drawn out or drawn into and a door panel installed in the door can be detachably provided in the cabinet.

A humidifying air purifier according to an embodiment of the present invention includes: a cabinet having one opened surface; a drawer coupled to the one opened surface of the cabinet so as to be drawn out or drawn into (pushed into) the cabinet; and a door panel positioned on one opened surface of the cabinet.

The humidifying air purifier according to an embodiment of the present invention may further include an intake formed on a bottom surface of the drawer, and an air filter and a humidifying filter accommodated in the drawer and installed on a rear side of the intake.

The door panel may be movable from the cabinet along with the operation of drawing the drawer out.

The cabinet may be formed in a polygonal shape, and the door panel may be disposed to form one surface of the cabinet.

The door panel may be detachably connected to the cabinet.

The humidifying filter may be positioned on the rear side of the air filter.

The drawer forms a water storage space for storing water at the rear side of the air filter, and the humidifying filter may be positioned in the water storage space.

In another point of view, the humidifying air purifier according to the embodiment of the present invention can suck air from the lower portion to perform air purification and air humidification, and then discharge the air to the upper portion. Accordingly, the humidifying air purifier can provide a structure for partitioning an air humidifying area in which water is used and an air purifying area in which water is to be prevented.

A humidifying air purifier according to an embodiment of the present invention includes: a cabinet opened frontward; and a drawer installed to be drawn out of the cabinet and including an air filter, a water tub, and a humidifying filter, the drawer has a bottom surface forming a base surface at a lower portion; both sides surfaces extending upward from both side ends of the bottom surface; and a front surface connecting the front ends of the both side surfaces and extending upward to be higher than the both side surfaces.

In addition, the drawer may further include a rear surface connecting the rear ends of both side surfaces.

The bottom surface of the drawer may include a water tub seating surface on which the water tub is seated; an air filter seating surface positioned in front of the water tub seating surface and extending to a position higher than the water tub seating surface to seat the air filter; and an air intake defined as an opening between the air filter seating surface and the front surface.

The water tub may form a water storage space for storing water provided in the humidifying filter.

The air intake may have a width W1 in the left and right direction larger than a width W2 in the front and rear direction.

The width W1 in the left and right direction may be provided to have a size correspond to a width of the air filter assembly in a lateral direction.

The air intake may be formed as space which is cut from the front end of the air filter seating surface to the rear end of the front surface of the drawer.

The drawer may further include a rear support jaw extending upward from a rear end of the air filter seating surface.

The rear support jaw may extend upward from the water tub seating surface by a predetermined height H4. There, the predetermined height H4 may be set to be larger than the vertical distance from the lowermost end to the uppermost end of the water tub. The rear support jaw can support the air filter from the rear side.

In another point of view, the humidifying air purifier can provide a structure capable of maximizing the intake area of air. In addition, the humidifying air purifier can provide a configuration in which a user can easily separate and install a configuration requiring maintenance.

Configurations requiring such management may include a water tub, an air filter assembly, a water container, and a humidifying filter assembly.

The air filter assembly may be disposed diagonally inside the drawer.

In addition, the humidifying filter of the humidifying filter assembly may be disposed diagonally inside the water tub.

A humidifying air purifier according to an embodiment of the present invention includes: a cabinet having an opened front surface; and a door assembly coupled to the cabinet so as to be drawn out or drawn into the cabinet, in which the door assembly includes a door bottom surface portion constituting a bottom surface and having an intake through which air is sucked; a door front surface portion defining a front end of the intake and extending upward; and an air filter assembly disposed above the suction port to be inclined.

In addition, the air filter assembly may have a lower end positioned at a rear end of the intake, and an upper end positioned at an upper end of the door front surface portion.

Here, the length from the lower end to the upper end of the air filter assembly is longer than the length from the upper end of the door front surface portion to the front end of the intake and/or the length from the front end of the intake to the lower end of the air filter assembly.

In other words, the air filter assembly may have a length from the lower end to the upper end which can be formed longer than any one of a first length from the front end to the rear end of the intake and a second length from the front end of the intake to the upper end of the door front surface portion.

In addition, the door assembly may include a door side surface portion extending rearward from both side ends of the door front surface portion and having a filter guide extending obliquely rearward from the upper end of the door front surface portion toward the door bottom surface portion; and a filter support extending in both directions from the filter guide and supporting the air filter assembly in the front direction.

The filter support portion may define a first length H1 which is a length of a base, a second length H2 which is a length of an edge which contacts the door front surface portion, and a third length H3 which is a hypotenuse (or an edge) connecting the base and the edge, and the third length H3 is longer than the second length H2 and the first length H1.

The filter guide extends obliquely rearward by a predetermined angle $\alpha 1$ and can support both side surfaces of the air filter assembly.

The filter support portion may support both side portions of the front surface of the air filter assembly.

The filter support portion may extend to correspond to a vertical length of the air filter assembly.

The vertical length of the air filter assembly may correspond to the third length H3.

The hypotenuse of the filter support portion can be inclined rearward from the upper end to the lower end by the predetermined angle $\alpha 1$. The predetermined angle $\alpha 1$ may have an acute angle.

The first length H1 may correspond to the width of the intake.

The air filter assembly may include a filter case to which an air filter is coupled.

The upper surface of the filter case may be formed as an inclined surface inclined downward by an inclination angle $\beta$ toward the rear end of the lower surface of the filter case.

The filter case may be formed in a rectangular shape with an inclined side surface.

The filter case may define a first parallel line P1 which is a virtual straight line drawn in an extending direction of an edge formed by the upper surface and the side surface of the filter case, a second parallel line P2 which is a virtual straight line drawn parallel to the first parallel line P2 from a front end of an edge formed by the lower surface and the side surface of the filter case, and an inclined line P3 which is a virtual straight line drawn along in an extending direction of an edge formed by the lower surface and the side surface of the filter case. There, the inclined line P3 may have a predetermined inclination angle $\beta$ from the second parallel line P2.

The upper surface of the filter case may extend downward with respect to the lower surface of the filter case to have the inclination angle $\beta$.

The lower surface of the filter case may extend upward with respect to the upper surface of the filter case to have the inclination angle $\beta$.

The door bottom surface portion may include an air filter seating portion on which the bottom surface of the air filter assembly is seated, and the air filter seating portion may be inclined upward toward the rear end.

The air filter seating portion may extend to have the inclination angle β.

The filter support portion and the air filter seating portion may be connected at their side ends to have a "V" shape. A side lower end of the air filter assembly can be fitted to a point where the filter support portion and the filter seating portion are connected to each other.

In another point of view, the humidifying air purifier according to the embodiment of the present invention can be provided so that the inner portion of the cabinet is not exposed to the user's gaze in a case where the door assembly drawn out of the cabinet is drawn out to the maximum. At the same time, the humidifying air purifier can be provided such that the management-requiring configurations described above are positioned in a space where the user can easily operate.

The humidifying air purifier according to an embodiment of the present invention includes: a body frame having an opening formed in a front surface thereof; a drawer drawn out of the body frame and into which an air filter assembly and a humidifying filter assembly positioned behind the air filter assembly are inserted; a rail guide coupled to both side surfaces of the drawer; and a sliding rail coupled to lower portions of both sides of the body frame and guiding the forward and rearward movement of the rail guide.

Here, in a case where the drawer is drawn out to the maximum, the humidifying filter assembly is positioned on a flat surface formed by the front end of the body frame.

Both side surfaces of the drawer may include an inner plate which accommodates the air filter assembly and the humidifying filter assembly; and an outer plate which is spaced apart from the outer side of the inner plate. The rail guide is positioned in a space between the inner plate and the outer plate.

Both side surfaces of the drawer may further include a plurality of reinforcing ribs extending from the inner plate to the outer plate.

The sliding rail or the rail guide may be provided with a stopper for limiting the distance to which the drawer may be drawn out of the cabinet.

The body frame may include a bar which is coupled to the front end thereof, and a lower end of the bar may be provided with a rail holding jaw protruding upward to limit the distance to which the sliding rail or the rail guide may be drawn out of the cabinet.

The rail holding jaw may protrude perpendicular to an advancing direction of the sliding rail or the rail guide.

The body frame may further include a rail cover positioned at the lower portions of both sides of the body frame and surrounding the sliding rail.

The rail holding jaw may be spaced forward from the front end of the rail cover.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s).

Figure 1:
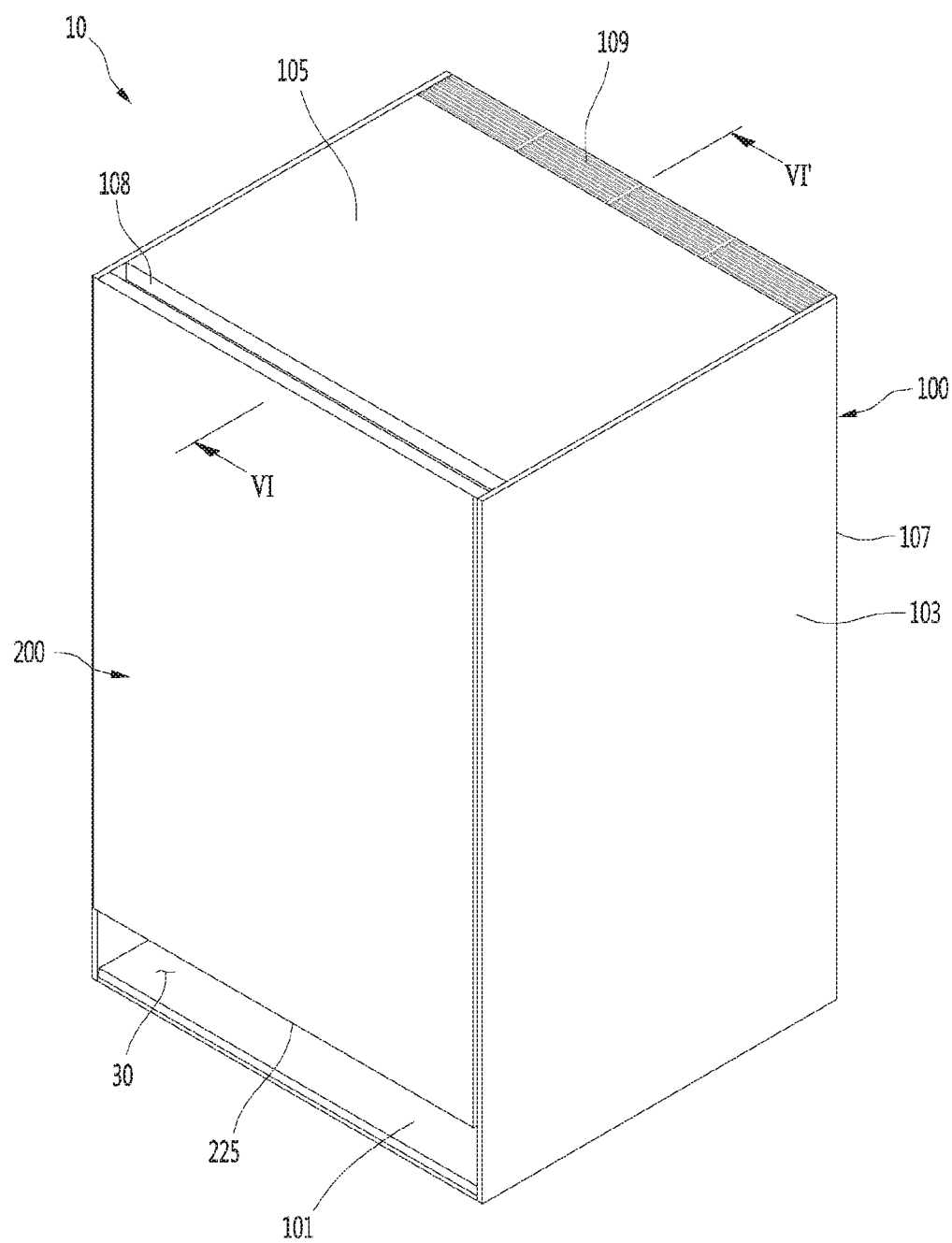
FIG. 1 is a perspective view illustrating a configuration of a humidifying air purifier according to an embodiment of the present invention.
Figure 2:
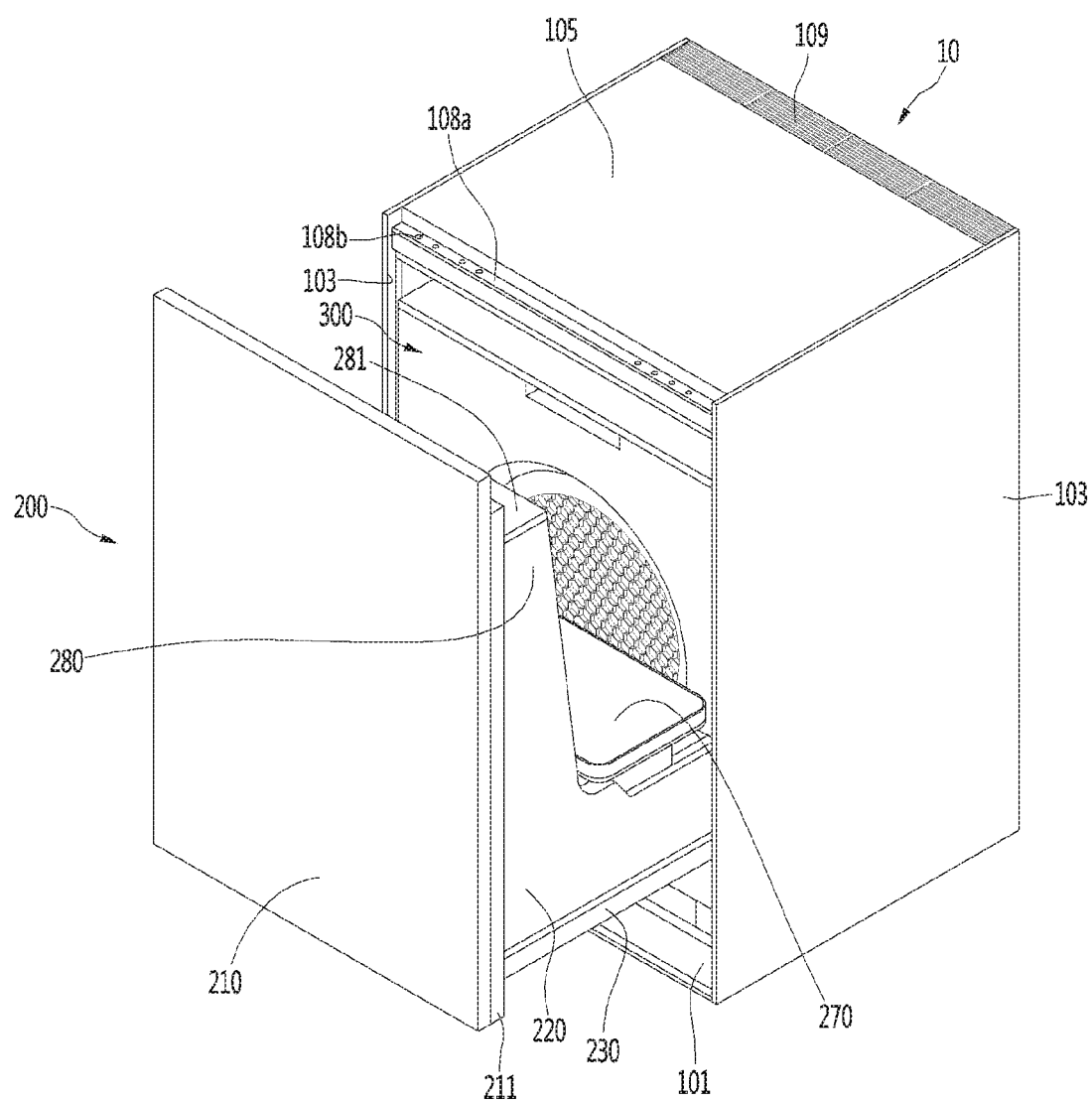
FIG. 2 is a view illustrating a state where a door of the humidifying air purifier according to an embodiment of the present invention is opened.

FIG. 1 is a perspective view illustrating a configuration of a humidifying air purifier according to an embodiment of the present invention, and FIG. 2 is a view illustrating a door of the humidifying air purifier according to an embodiment of the present invention.

Referring to FIG. 1 and FIG. 2, the humidifying air purifier 10 according to an embodiment of the present invention includes a cabinet 100 forming an outer appearance and a door assembly 200 coupled to the cabinet 100 to be capable of being drawn out from the cabinet.

The cabinet 100 includes a panel assembly composed of a plurality of panels.

The door assembly 200 can be taken out from the inner space formed by the panel assembly. For example, the user may pull the door assembly 200 out of the cabinet 100. The door assembly 200 may be taken out from the inside of the cabinet 100 in an outer direction due to the external force applied to the door assembly 200 by the user.

Of course, the user can insert the door assembly 200 back into the cabinet 100 by providing an external force in the opposite direction to the door assembly 200.

The plurality of panels includes a lower first base 101, two side panels 103 provided on both sides of the first base 101 and extending upward, an upper panel 105 coupled to an upper side of the two side panels 103, and a rear panel 107 coupled to a rear side of the two side panels 103.

By the first base 101, the two side panels 103, the upper panel 105, and the rear panel 107, the cabinet 100 can have a shape of a rectangular parallelepiped which is opened frontward.

In addition, the side panels 103 on both sides may include a first side panel which forms one side surface of the cabinet 100 and a second side panel which forms the other side of the cabinet 100.

The plurality of panels may be made of wood material. Therefore, the humidifying air purifier 1 can have the aesthetic appearance of furniture. In other words, the appearance can be enhanced.

An air filter assembly 280, a humidifying filter assembly 300, and an air blowing fan 480 (see FIG. 7) may be disposed in the internal space of the cabinet 100.

The door assembly 200 may be opened by being drawn out to the front side of the cabinet 100 or closed by being drawn into the cabinet toward the rear side of the cabinet 100. The door assembly 200 includes a door panel 210 constituting a front surface portion of the humidifying air purifier 10. The door panel 210 may be referred to as "a front panel".

The door panel 210 may be positioned on one surface of the cabinet 100. For example, the door panel 210 may be positioned at a front surface opening of the cabinet 100. Therefore, the door panel 210 may form a front surface of the cabinet 100. Accordingly, the door panel 210 and the cabinet 100 can provide a sense of unity to the user.

The door panel 210 may be movable from the cabinet 100. For example, the door panel 210 may be spaced apart from the cabinet 100 by a drawer 220 drawn out of the front surface of the cabinet 100.

The door panel 210 may have a shape of a square plate. In a state where the door assembly 200 is closed, the door panel 210 forms a front surface of an outer appearance of the humidifying air purifier 10. In addition, the door panel 210 is made of wood material so that it can have a similar aesthetic appearance to furniture.

A recessed portion 30 may be formed between the lower end of the door panel 210 and the first base 101 to form a space recessed rearward.

An air intake 225 for sucking air into the cabinet 100 may be formed on the recessed portion 30.

Hereinafter, the air intake 225 may be referred to as an intake 225. For example, the intake 225 may be formed on the bottom surface of the drawer 220.

The recessed portion 30 may be defined as a space between the first base 101 and the intake 225 formed below the door panel 210.

In addition, the recessed portion 30 may be defined as a space in which an opening defined by a lower edge of the door panel 210 and a first base 101 positioned below the lower edge extends rearward to a base extending portion 115.

The upper panel 105 of the cabinet 100 is formed with a discharge portion 109 through which purified air is discharged. The discharge portion 109 may be positioned on the rear side of the upper panel 105.

The discharge portion 109 may be formed in a flat surface with the upper panel 105. For example, the upper end of the discharge portion 109 may be formed at the same height as the upper end of the upper panel 105.

The door assembly 200 further includes a drawer 220 extending rearward from a rear surface of the door panel 210.

Cleaning components of the humidifying air purifier 10 are installed in the drawer 220. The cleaning components may include an air filter assembly 280 and a humidifying device. The humidifying device may include a humidifying filter assembly 300, a water tub 260, and a water container 270.

When the door assembly 200 is drawn out to the front side to open the front surface of the cabinet 100, the air filter assembly 280, the humidifying filter assembly 300, and the water container 270 disposed in the drawer 220 can be drawn out forward together. Accordingly, the user can easily access the air filter assembly 280, the humidifying filter assembly 300, and the water container 270.

The drawer 220 may be coupled to the cabinet 100 so as to be drawn out from the cabinet 100 or drawn back into the cabinet. Accordingly, the drawer 220 may be referred to as "door" or "accommodation portion".

The door assembly 200 further includes rail guides 230 for guiding the operation of drawing the door assembly 200 out or into the cabinet 100. The rail guides 230 may be coupled to both sides of the lower portion of the drawer 220.

In other words, the door assembly 200 is provided to be movable in the front and rear direction from the cabinet 100. Accordingly, the door assembly 200 may be provided so as to be in close contact with the front end portion of the cabinet 100 in a state where the door assembly 200 is drawn into the cabinet.

In detail, the door assembly 200 may include sealing means for sealing the opened front surface of the cabinet 100. The sealing means may include a sealing frame 211 and a sealing member 212, which will be described later.

The sealing means may seal a minute gap formed between the cabinet 100 and the door assembly 200. Therefore, the outside air can intensively flow into the recessed portion 30 or the intake 225.

A display 108a on which the operation information of the air purifier is displayed is disposed in front of the upper panel 105. The display 108a may extend in the left and right direction to be lengthened and may be provided on the upper surface of the front portion of the display module 452 to be described later. In addition, the display 108a may be provided with an input unit 108b capable of inputting by a user.

A plurality of the input units 108b may be provided to set an operation mode or an operation function of the air purifier 10. For example, the input unit 108b may include a plurality of the input units so as to perform set modes (or functions) such as "power input unit", "clean intensity", "rapid clean", "humidification clean", "sleep mode", "air sterilization", "mode illumination", and "locking".

The display 108a may be positioned between the upper panel 105 and the door 200. In detail, a display groove 108, which is downwardly recessed, is formed on the upper portion of the cabinet 100. For example, the upper end of the door panel 210 may be spaced forward from the front end of the upper panel 105. In addition, the display groove 108 may be defined as a space formed in between the door panel 210 and the upper panel 105.

Therefore, the display 108a is exposed to the outside through the display groove 108, so that the user can confirm the operation information or operate the input unit 108b.

The upper panel 105 is configured to be flat so that the user can utilize the upper panel 105 as a storage space. Goods, food, and the like are placed on the storage space. Therefore, it may not be easy to dispose a display on the upper panel that the user should visually confirm. If the display is disposed at the central portion of the upper panel, the display may be blocked by the object or the food.

In the present embodiment, so as to prevent such a problem, the display 108a may be positioned between a front surface of the upper panel 105 and a rear surface of the door. Then the door 200 is drawn out frontward, the front surface of the display 108a may be exposed to the outside.

Figure 3:
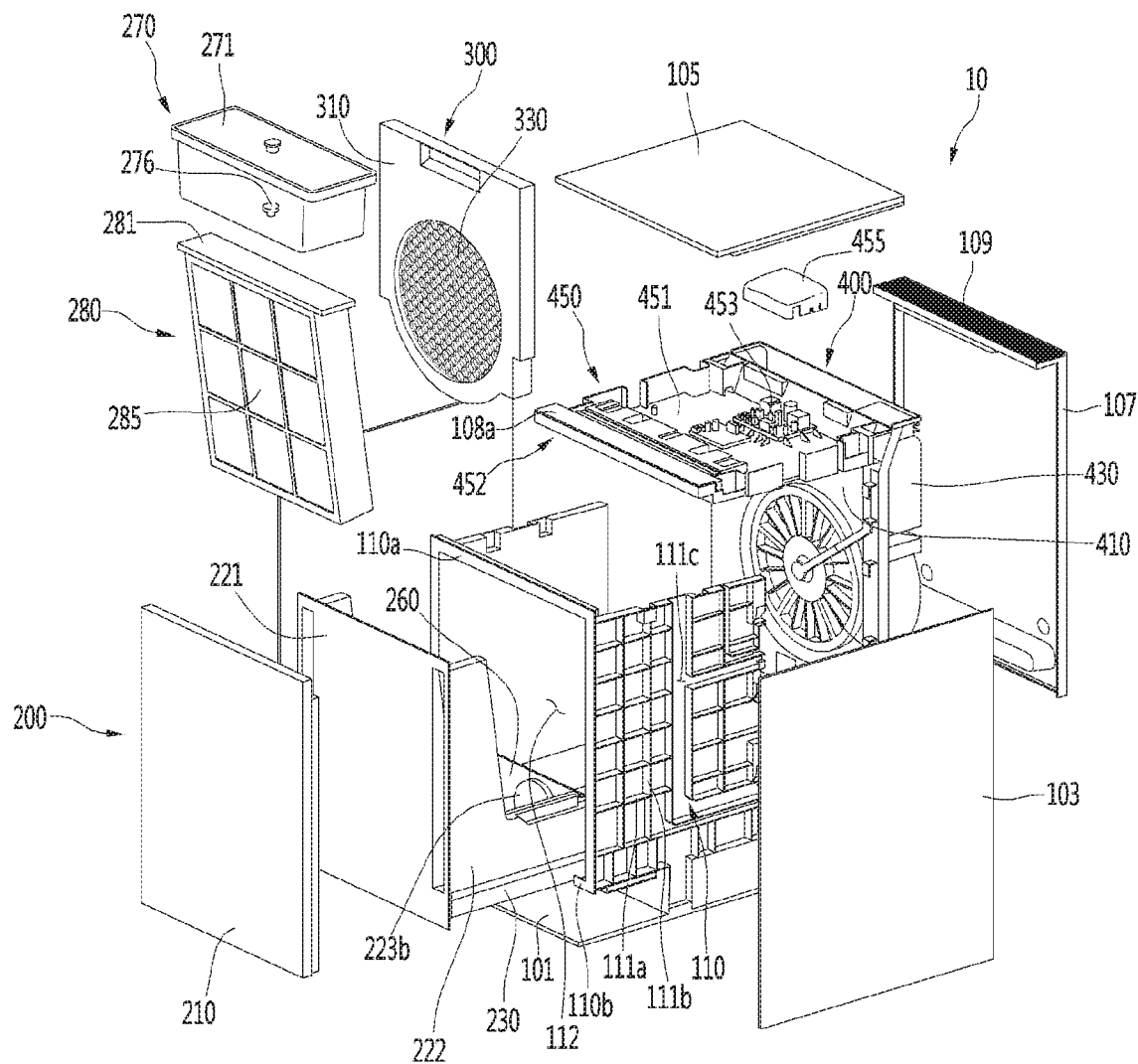
FIG. 3 is an exploded perspective view illustrating a configuration of the humidifying air purifier according to an embodiment of the present invention.
Figure 4:
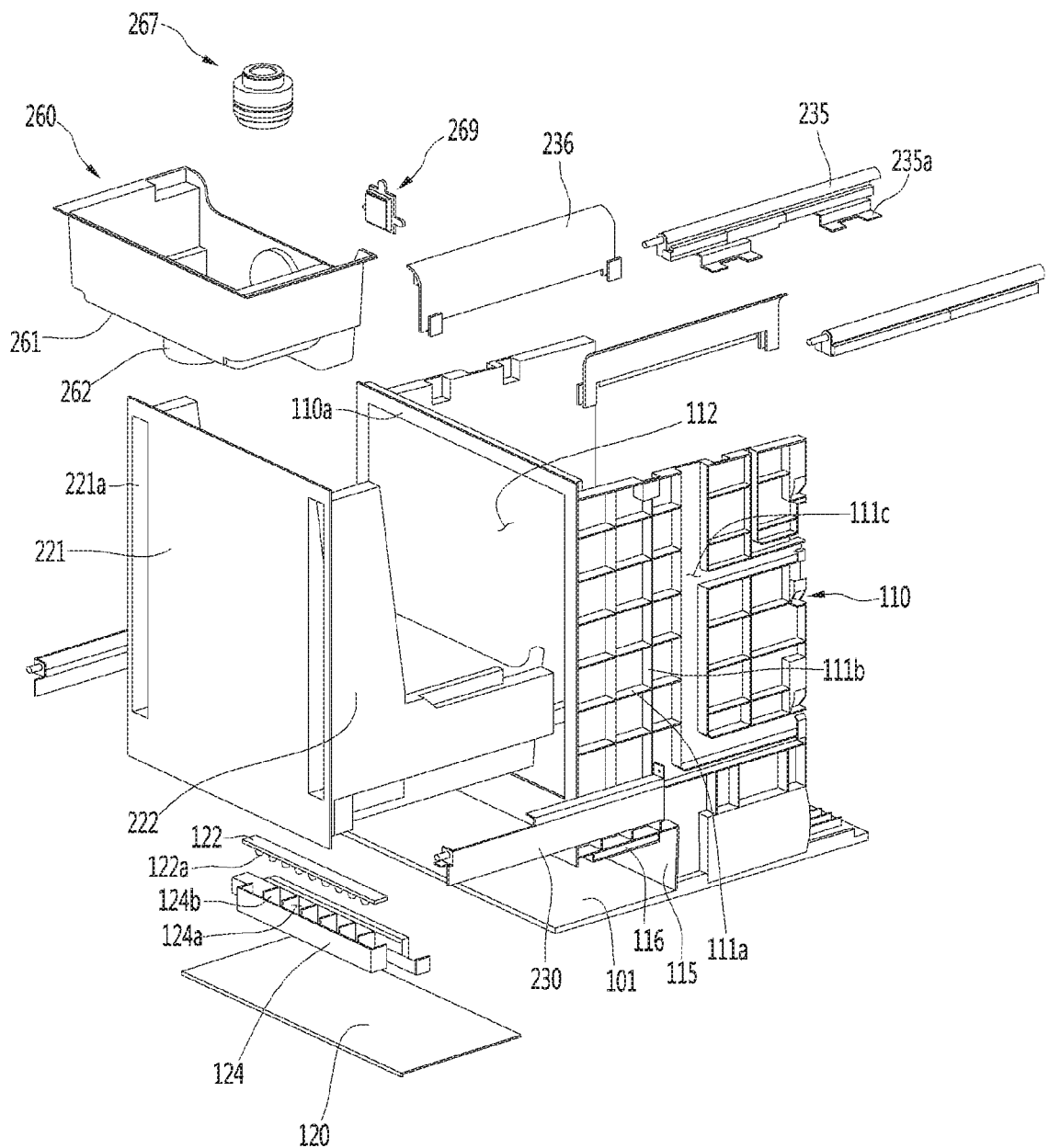
FIG. 4 is an exploded perspective view illustrating a configuration of a portion of the humidifying air purifier according to an embodiment of the present invention.
Figure 5:
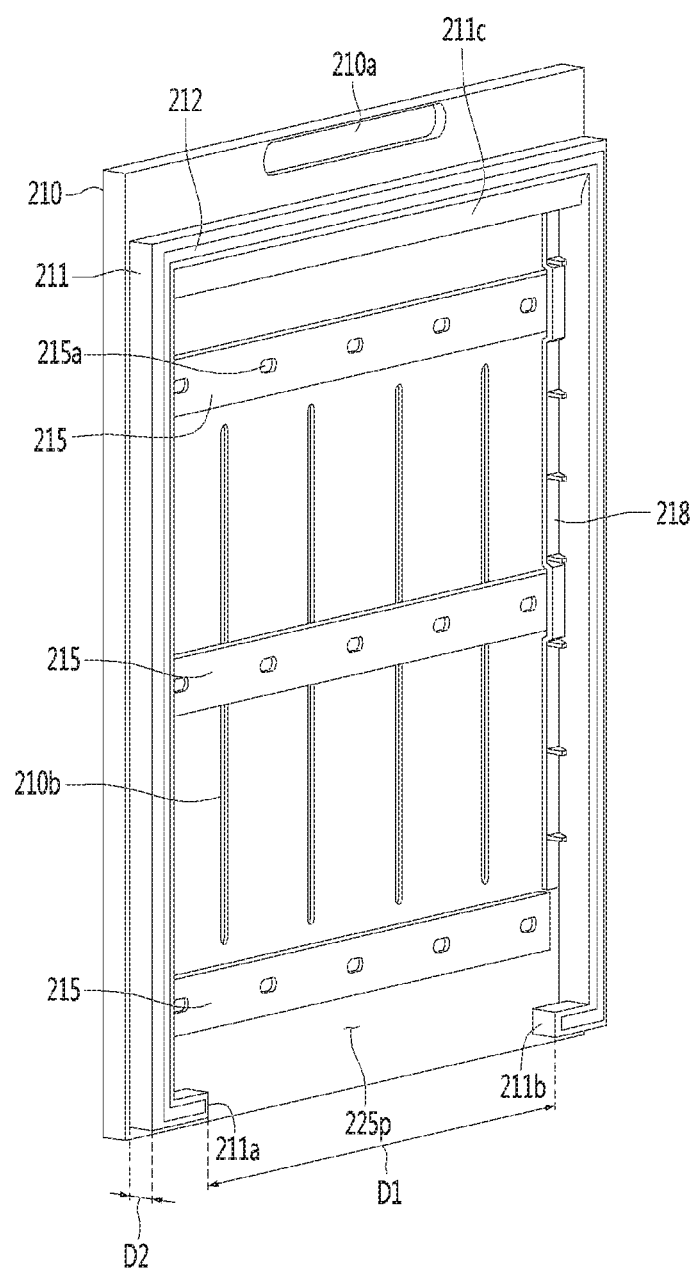
FIG. 5 is a view illustrating a configuration of a door panel according to an embodiment of the present invention.
Figure 6:
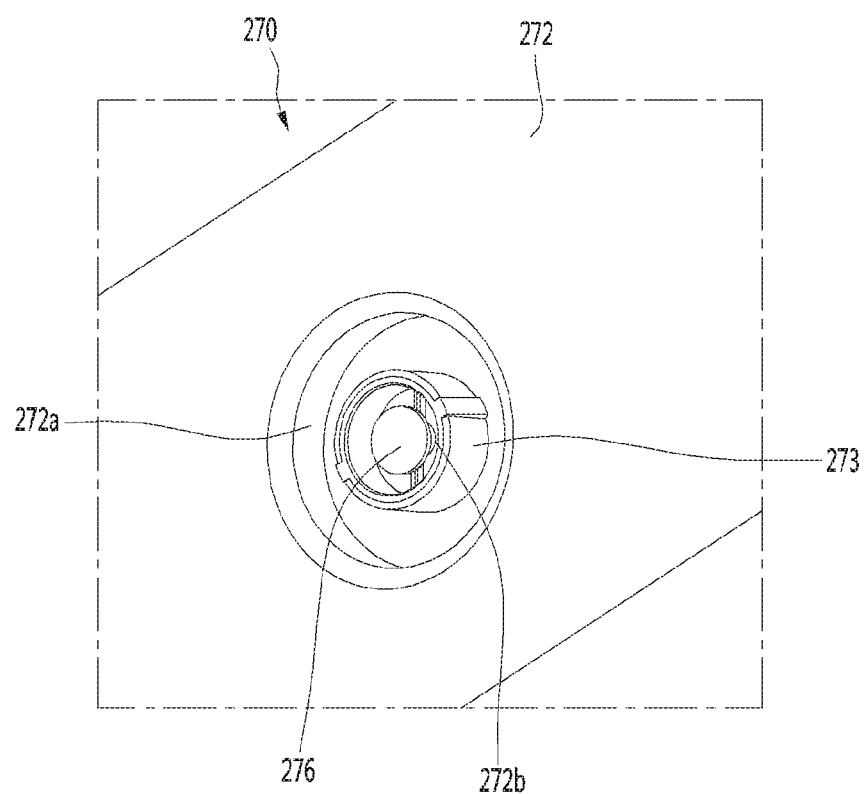
FIG. 6 is a view illustrating a configuration of a bottom surface of a water container according to an embodiment of the present invention.
Figure 7:
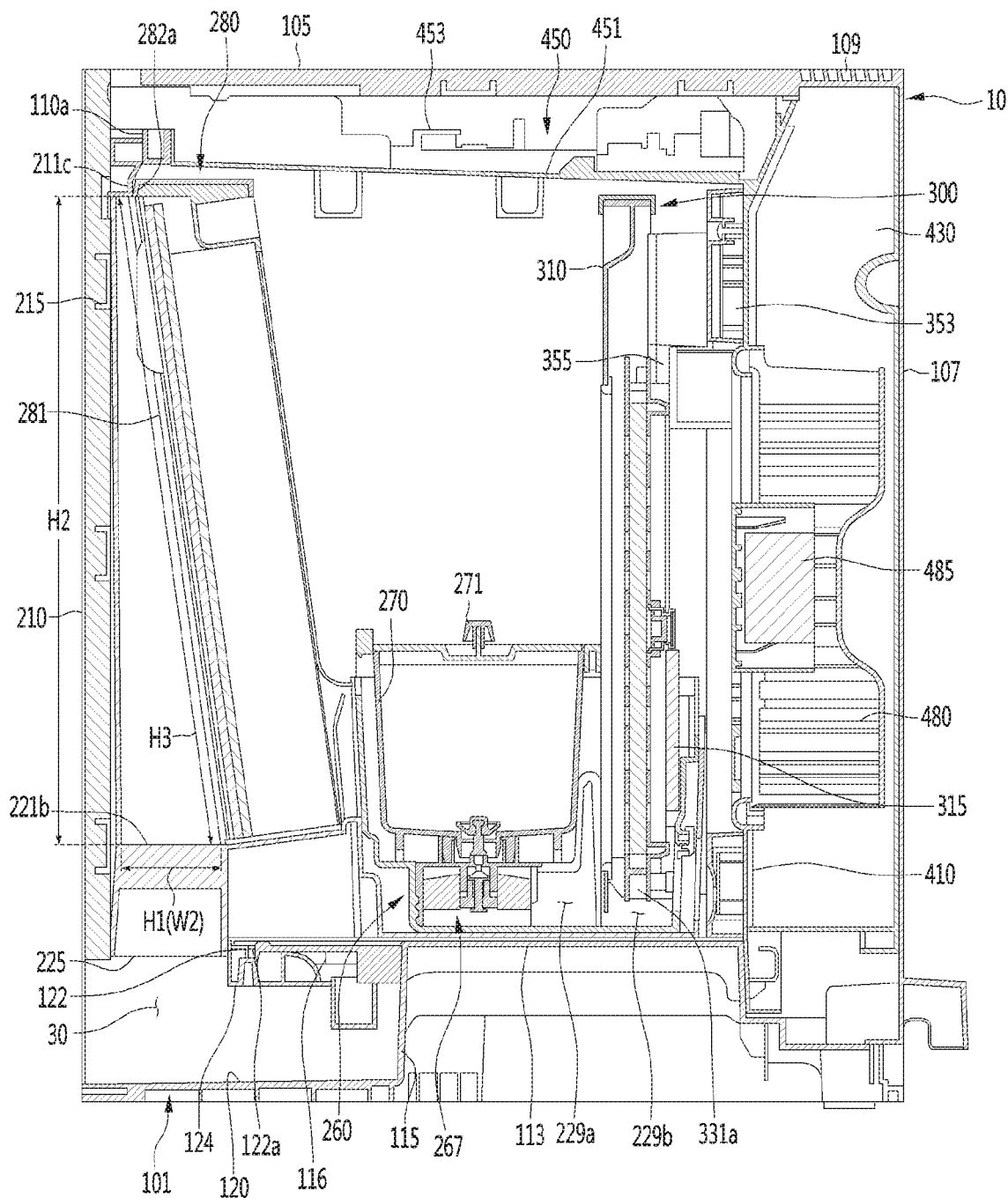
FIG. 7 is a sectional view taken along line VI-VI' of FIG. 1.

FIG. 3 is an exploded perspective view illustrating a configuration of the humidifying air purifier according to an embodiment of the present invention, FIG. 4 is an exploded perspective view illustrating a configuration of a portion of the humidifying air purifier according to an embodiment of the present invention, FIG. 5 is a view illustrating a configuration of a door panel according to an embodiment of the present invention, FIG. 6 is a view illustrating a configuration of a bottom surface of a water container according to an embodiment of the present invention, and FIG. 7 is a sectional view taken along line VI-VI' of FIG. 1.

Referring to FIG. 3 to FIG. 7, a humidifying air purifier 10 according to an embodiment of the present invention includes an air filter assembly 280 for filtering air, a humidifying filter assembly 300 for humidifying air, and an air blowing fan 480 for generating an air flow. A fan motor 485 is coupled to the air blowing fan 480.

In detail, the cabinet 100 includes a body frame 110 forming a space portion 112 in which the above-described components are disposed.

The body frame 110 may have a hexahedron shape in which front, rear, and upper surfaces are opened. In detail, the front surface of the body frame 110 is opened, and the opened front surface can be shielded by the door assembly 200. In addition, the rear surface of the body frame 110 is opened, and the opened rear surface can be shielded by a fan housing 410 and a housing cover 430. In addition, the upper surface of the body frame 110 is opened, and the opened upper surface may be shielded by an electric unit 450.

The first base 101 can be understood as a constituent portion of the body frame 110.

The two side panels 103 are coupled to both sides of the body frame 110. In other words, the body frame 100 may include a first side surface which is one side surface and a second side surface which is the other side surface.

One side panel 103 of the two side panels 103 may be coupled to the first side surface. In addition, the other side panel 103 of the two side panels 103 may be coupled to the second side surface. There, the side panel 103 coupled to the first side surface is referred to as a first side panel 103, and the side panel 103 coupled to the second side surface is referred to as a second side panel 103.

The upper panel 105 is coupled to the upper side of the electric unit 450 and the rear panel 107 is coupled to the rear side of the housing cover 430.

Meanwhile, as described above, at least one of the door panel, the first side panel, the second side panel, and the upper panel may be formed of wood material.

Accordingly, the plurality of panels 103, 105, and 107 may include grooves 210b which are formed by cutting into the inner surfaces of the respective panels 103, 105, and 107 with relatively small widths and depths to prevent deformation of the wood material and enhance durability, and a plurality of reinforcing frames 215 inserted into the inner surfaces of the panels 103, 105, and 107.

The wooden grooves 210b may be elongated along the extending direction of the panel, and may be formed in a plurality of the grooves. For example, the wooden grooves 210b may be engraved on at least one of the plurality of panels 103, 105, and 107 in a straight line in the longitudinal direction of the inner surface.

The reinforcing frame 215 may have holes 215a for fastening to a configurations for coupling to the plurality of panels. For example, a fastening member to be fastened to the front surface 221 of the drawer may be inserted into the hole 215a of the reinforcing frame 215 inserted into the door panel 210. In addition, the reinforcing frame 215 may be formed of a metal material.

The first and second side panels 103 coupled to both side surfaces of the body frame 110 may extend forward of the bar 110a defining the front surface opening of the body frame 110.

The inner surface of each of the first and second side panels 103 positioned forward of the bar 110a of the body frame may be in close contact with the outer surface of the sealing frame 211. Accordingly, at least two of the outer surfaces of the sealing frame 211 may be in close contact with the cabinet 100 so that the door assembly 200 may be provided with a double sealing structure excluding the intake 225 in a state of being drawn thereinto.

The bar 110a of the body frame 110 may be formed as a rectangular frame so as to define a front surface opening of the body frame 110.

However, the bar 110a of the body frame may be cut by a predetermined length to form a space between the body frame and the door assembly in order to avoid any interference occurring when the door assembly 200 is drawn out or into the cabinet 100.

Here, the predetermined length may be defined as a length corresponding to the gap D1 of the sealing frame 211 to be described later. For example, the bar 110a of the body frame may be provided in a rectangular shape having an opened base.

The bar 110a of the body frame 110 may extend along the front ends of both side surfaces of the body frame 110. The bar 110a may extend from the lower side of the display module 452 to connect upper ends of both side surfaces of the body frame 110.

The lower end portion 110b of the bar 110a of the body frame may be bent in directions facing each other from the front ends of both side surfaces of the body frame 110.

There, the lower end portion 110b of the bar 110a may be cut so as not to interfere with the drawer 220.

In other words, the lower end portion 110b of the bar 110a of the body frame, which extend from both side surfaces of the body frame 110, respectively, may extend to be spaced apart from each other by a predetermined length in directions facing each other.

In addition, the bar 110a of the body frame and the sealing means are provided so as to be in close contact with each other when the door assembly 200 is drawn into. Therefore, the bar 110a of the body frame and the sealing means can be formed to correspond to each other.

As a result, the sealing means provided on the rear side of the door panel 210 can be in close contact with the bar 110a and the surfaces of the first and second side panels 103 extending to protrude forward from the bar 110a.

Therefore, the sealing means can seal the gap between the cabinet 100 and the door assembly 200 with two vertical surfaces. Accordingly, the inflow of air into the gap can be more effectively blocked.

On both side surfaces of the body frame 110, a plurality of reinforcing ribs 111a and 111b may be provided. The reinforcing ribs 111a and 111b includes plurality of first reinforcing ribs 111a extending in the lateral direction and a plurality of second reinforcing ribs 111b extending in the direction intersecting the first reinforcing ribs 111a. For example, the second reinforcing rib 111b may extend in the longitudinal direction.

In addition, on both side surfaces of the body frame 110, a drainage flow path 111c for guiding the fluid drained from the electric unit 450 downwardly may be formed. The drainage flow path 111c can be understood as a flow path formed between the first and second reinforcing ribs 111a and 111b.

The door assembly 200 includes a door panel 210 forming an outer appearance of a front surface and a drawer 220 extending to the rear side of the door panel 210.

The width of the door panel 210 in the side direction may be set smaller than the distance between the two side panels 103. Accordingly, the door panel 210 may be inserted between the two side panels 103 to form a flat surface. According to this, the door panel 210 and the two side panels 103 can provide a sense of unity of the outer appearance to the user, so that the door panel 210 and the two side panels 103 are visually clean and can provide an outer appearance suitable for recognition as furniture.

The door panel 210 may include a handle groove 210a formed by being recessed at an upper portion of a rear surface of the door panel 210 so as to be held by the user. Accordingly, the user can draw out the door assembly 200 while pulling his/her hand through the handle groove 210a by putting his/her hand into the display groove 108.

The door panel 210 may further include a panel frame 218 for guiding the coupling with the front surface of the drawer 220.

The panel frame 218 may be coupled to the rear surface of the door panel 210. The panel frame 218 may be positioned inside the sealing frame 211 to be described later. For example, the panel frame 218 may be coupled to the panel coupling portion 221a to be described later by a fastening member.

Meanwhile, as described above, the door assembly 200 may further include sealing means. The sealing means may include a sealing frame 211 and a sealing member 212.

In detail, the sealing frame 211 may be coupled to the rear surface of the door panel 210. The sealing frame 211 may be formed to correspond to the bar 110a of the body frame 110. For example, the sealing frame 211 may have a rectangular shape with an opened base.

In other words, the lower portion of the sealing frame 211 may be cut by a predetermined length D1. For example, the lower portion of the sealing frame 211 may form an opening communicating with the intake 225. Accordingly, the lower end portions 211a and 211b of the sealing frame 211 can be spaced apart by the predetermined length D1 in directions facing to each other.

The lower end portions 211a and 211b of the sealing frame 211 may be positioned below the intake 225 or at both side ends of the front portion of the intake 225. In detail, the lower end portions 211a and 211b may form an incision space (or a sealing frame gap) communicating with the intake 225 together with the lower end portion 110b of the bar 110a.

The incision space (or the sealing frame gap in between lower end portions 211a and 211b) is in flow communication with a portion 255a of the intake 225. For example, when the lower end portions 211a and 211b and the lower end portion 110b are in close contact with each other, the incision space (or the sealing frame gap) may define both front ends of the inlet 225. Accordingly, the air sucked from the lower end of the door panel 210 can intensively flow into the incision space.

Specifically, the lower end of the sealing frame 211 may include a first end portion 211a which is bent perpendicularly at one lower end and a second end portion 211b which is vertically bent at the other lower end. The first end portion 211a and the second end portion 211b may extend horizontally and may be spaced apart by the predetermined length D1.

The predetermined length D1 may be referred to as a lower gap D1 of the sealing frame 211.

Since the lower end portions 211a and 211b of the sealing frame 211 are spaced apart from each other by the lower gap D1, the sealing frame gap between the first end portion 211a and the second end portion 211b, may form a portion 225p of the intake 225.

Accordingly, in a case where the door assembly is drawn into the body frame 110 and the sealing frame 211 and the bar 110a of the body frame are in contact with each other, the lower end portions 211a and 211b of the sealing frame 211 and the lower end portion 110b of the bar 110a of the body frame are cut and opened downward to form a portion 225p of the suction port 255 so that the intake cross-sectional area of the air can be expanded.

Meanwhile, the lower gap D1 can be understood as a length corresponding to the width W1 of the air intake 225 in the left and right direction to be described later.

The outer circumferential length of the sealing frame 211 may be smaller than the circumferential length of the door panel 210. The outer circumferential length of the sealing frame 211 and the bar 110a of the body frame may be the same.

In addition, the circumferential length of the door panel 210 may be smaller than the front circumferential length of the cabinet 100. The upper edge of the door panel 210 may be disposed at a height corresponding to the upper edge of the front end of the cabinet 100. Therefore, a recessed space or recessed portion 30 is formed on the lower side of the door panel 210 to guide the inflow of air.

Meanwhile the width D2 of the sealing frame 211 may be set to a length corresponding to the length of the first and second side panels 103 protruding forward from the bar 110a.

Therefore, the sealing frame 211 is in close contact with the first and second side panels 103 and the bar 110a of the body frame, thereby reducing unnecessary flow loss and noise. The sealing frame 211 may concentrate the intake of the air to the recessed portion 30 or the intake 225.

In other words, in a case where the drawer 220 is drawn into the body frame 110, the front surface of the bar 110a defining the front surface opening of the body frame 110 and the front surface of the sealing frame 211 can be in close contact with each other. At this time, the outer surface of the sealing frame 211 may be in close contact with the first side panel 103 or the second side panel 103.

In short, at least two of the outer surfaces of the sealing frame 211 can be in close contact with at least one of the bar 110a, the first side panel 103 and the second side panel to seal the front surface opening.

Accordingly, double sealing between the sealing frame 211 and the body frame 110 is possible so that the flow of the air introduced into the intake 225 can be effectively guided to the air filter assembly 280 without leakage or loss.

Meanwhile, the sealing frame 211 may form a central groove into which the sealing member 212 is inserted. The central groove may be formed by recessing the central portion of the rear surface of the sealing frame 211. The central groove may extend in the extending direction of the sealing frame 211.

The sealing member 212 may be inserted into the rear surface of the sealing frame 211. In other words, the sealing member 212 can be inserted into the center groove of the sealing frame 211.

The sealing member 212 may be formed of a material capable of maintaining airtightness when the sealing member 212 is in close contact with the bar 110a of the body frame. For example, the sealing member 212 may include rubber.

The door panel 210 may further include a cover frame 211c which is in close contact with a filter cover 282a provided on the upper portion of the air filter assembly 280.

The cover frame 211c may be connected to an upper portion forming an upper side of the sealing frame 211. For example, cover frame 211c may extend roundly downward from the upper side of the sealing frame 211 of the cover frame 211c.

The rear surface of the cover frame 211c may be formed to correspond to the front surface of the filter cover 282a. For example, if the front surface of the filter cover 282a is formed in a round shape, the rear surface of the cover frame 211c may be formed into a corresponding round shape.

Therefore, when the door assembly 200 is drawn into the cabinet 100, the cover frame 211c is brought into close contact with the filter cover 282a, so that the air sucked into the intake 225 can be guided to pass through the air filter 285 without loss or leakage.

The front surface 221 of the drawer 220 may be coupled to the rear surface of the door panel 210. In other words, the door panel 210 may cover the front surface opening of the body frame 110.

Meanwhile, the front surface 221 of the drawer may be referred to as a door front surface portion 221 or "first wall" of the drawer. In addition, the door panel 210 and the door front surface portion 221 together may be referred to as "door front surface portion".

The door front surface portion 221 may be provided with a panel coupling portion 221a coupled to a rear surface of the door panel 210. For example, the panel coupling portion 221a is recessed rearward from the door surface portion 221 and the fastening member is coupled to the panel coupling portion 221a so that the panel coupling portion 221a can be fastened to the panel frame 218 of the door panel 210.

The drawer 220 may further include a connector 221b extending from a rear surface of the door front surface portion 221 to a front surface of the air filter seating portion 226.

In other words, the connector 221b may be positioned in a space between the door front surface portion 221 and the air filter seating portion 226, which is defined as the intake 225.

The connector 221b may be positioned at a lower portion of the rear surface of the door front surface portion 221. The connector 221b may be positioned above the intake 225. For example, the connector 221b may extend rearward to have a relatively thin width so as to minimize the resistance of air flowing from the rear surface of the door front surface portion 221 to the intake 225.

The connector 221b can support the door front surface portion 221 relatively weak in impact due to the position of the intake 225. Therefore, the connector 221b can prevent the deformation of the door front surface portion 221, thereby improving the durability of the drawer 220.

The drawer 220 further includes a door side surface portion 222 extending rearward from both sides of the door front surface portion 221, a door lower surface portion 224 provided below the door side surface portion 222, and a door rear surface portion 223 extending upward from the rear side of the door lower surface portion 224.

Meanwhile, the door side surface portion 222 may be referred to as a side surface of the drawer 220 or "second wall" of the drawer. The door lower surface portion 224 may be referred to as a bottom surface of the drawer 200 or "third wall" of the drawer. Likewise, the door rear surface portion 223 may be referred to as the rear wall of the drawer or "fourth wall" of the drawer.

The intake 225 may be formed in the lower surface portion 224 of the door.

In addition, an installation space in which a water tub 260, a water container 270, and a humidifying filter assembly 300 are installed can be defined in the drawer 220, by the door front surface portion 221, the door lower surface portion 224, the door side surface portion 222, and the door rear surface portion 223.

For example, the air filter assembly 280 may be installed at a front portion of the drawer 220. The air filter assembly 280 may include an air filter case 281 and an air filter 285 coupled to the air filter case 281. The air filter assembly 280 may be disposed to be lifted upward and separated.

A water container 270 may be disposed at a substantially central portion of the drawer 220, that is, on the rear side of the air filter assembly 280, with respect to the front and rear direction.

The water container 270 may be installed inside the water tub 260. The water container 270 can be arranged to be lifted upward and separated from the water tub 260 and the user can separate the water container 270 to replenish water or clean the water container 270. In addition, an openable water container lid 271 may be provided on the water container 270.

A valve hole 272b for discharging water and a valve device 276 for selectively opening and closing the valve hole 272b may be provided on the bottom surface 272 of the water container 270.

The bottom surface 272 of the water container 270 may further include a valve bracket 273 protruding to surround the valve device 276. The valve bracket 273 may be radially spaced about the valve device 276 to protect the valve device 276. For example, the valve bracket 273 may have a cylindrical shape protruding downward from the bottom surface 272.

The bottom surface 272 of the water container 270 may be formed with a coupling space 272a through which the valve bracket 273 and the valve device 276 are coupled with a float device 267 to be described later. For example, the coupling space 272a may be formed as a recessed space.

The valve device 276 can open the valve hole 275a when the water container 270 is placed on the water container support portion 261 provided in the water tub 260 and the valve device 276 can close the valve hole 275a when the water container 270 is separated from the water container support portion 261.

The water tub 260 may have a substantially hexahedral shape with an opened upper portion. The water container support portion 261 for supporting the water container 270 is included in the lower portion of the water tub 260. The water container support portion 261 forms a flat surface.

The water tub 260 further includes a float accommodating portion 262 protruding downward from the water container support portion 261 and having a space in which the float device 267 is installed. The float accommodating portion 262 may have a hollow shape with an empty interior. For example, the float accommodating portion 262 may be positioned at a substantially central portion of the water container support portion 261.

The float accommodating portion 262 forms a first water storage portion 229a in which water is stored and the float device 267 can be provided to be moved in the up and down direction according to the water level stored in the first water storage portion 229a. At this time, when the water level of the first water storage portion 229a becomes equal to or higher than the set water level, the float device 267 can move upward to close the valve hole 275a of the water container 270.

A second water storage portion 229b extending rearward from the float accommodating portion 262 and storing water may be formed in the water tub 260. The second water storage portion 229b communicates with the first water storage portion and may form the same water level as the first water storage portion.

The humidifying filter assembly 300 may be installed in the second water storage portion 229b. The humidifying filter assembly 300 may be accommodated in a rear portion of the inner space of the drawer 220. The humidifying filter assembly 300 may be disposed on the rear side of the water container 270.

The humidifying filter assembly 300 includes a humidifying filter case 310 and a humidifying filter 330 that is rotatably supported by the humidifying filter case 310 and absorbs water stored in the water tub 260.

The humidifying filter 300 includes a circular humidifying filter frame 331 and a filter medium 332 disposed inside the humidifying filter frame 331 and having a circular shape.

The lower portion of the humidifying filter 330 may be disposed to be submerged in the second water storage portion 229b.

The humidifying filter 330 has a substantially circular shape and the outer circumferential portion of the humidifying filter 330 includes a collecting rib 331a having a structure capable of holding water. The collecting rib 331a may be provided inside the humidifying filter frame 331 and extend in the radial direction. A plurality of collecting ribs 331a are provided, and a space between the plurality of collecting ribs 331a forms a water storage space. The humidifying filter 330 and the humidifying filter frame 331 may have a structure similar to that of a water-wheel.

When the humidifying filter 330 is rotatably provided, the water collected by the collecting rib 331a moves upward. And, the water flows to the central portion of the humidifying filter 330 by gravity. The humidifying filter 330 may be made of a cloth, a felt, or a sponge material that can easily absorb water.

A sterilizing device 269 for irradiating light toward the inside of the water tub 260 may be disposed on the rear side of the water tub 260 so as to sterilize the water stored in the water tub 260. For example, the sterilizing device 269 may include an ultraviolet LED.

The humidifying air purifier 10 further includes a housing assembly 400 disposed inside the cabinet 100. The housing assembly 400 may be disposed on the rear side of the door assembly 200. In other words, the housing assembly 400 is disposed on the rear side of the rear portion 223 of the drawer 220.

In detail, the housing assembly 400 is provided with an air blowing fan 480 for generating an air flow, a fan housing 410 having a fan intake 415 disposed in front of the air blowing fan 480 and sucking air therein, and a housing cover 430 coupled to the rear side of the fan housing 410. The air blowing fan 480 may be installed in a fan installation space defined by the fan housing 410 and the housing cover 430.

The air blowing fan 480 includes a centrifugal fan which sucks air in an axial direction and discharges the air in a radial direction. For example, the centrifugal fan may include a sirocco fan. The axial direction of the air blowing fan 480 may be a front and rear direction. The fan motor 485 connected to the air blowing fan 480 is supported at the central portion of the fan housing 410 and can be axially coupled to the center of the air blowing fan 480.

Figure 13:
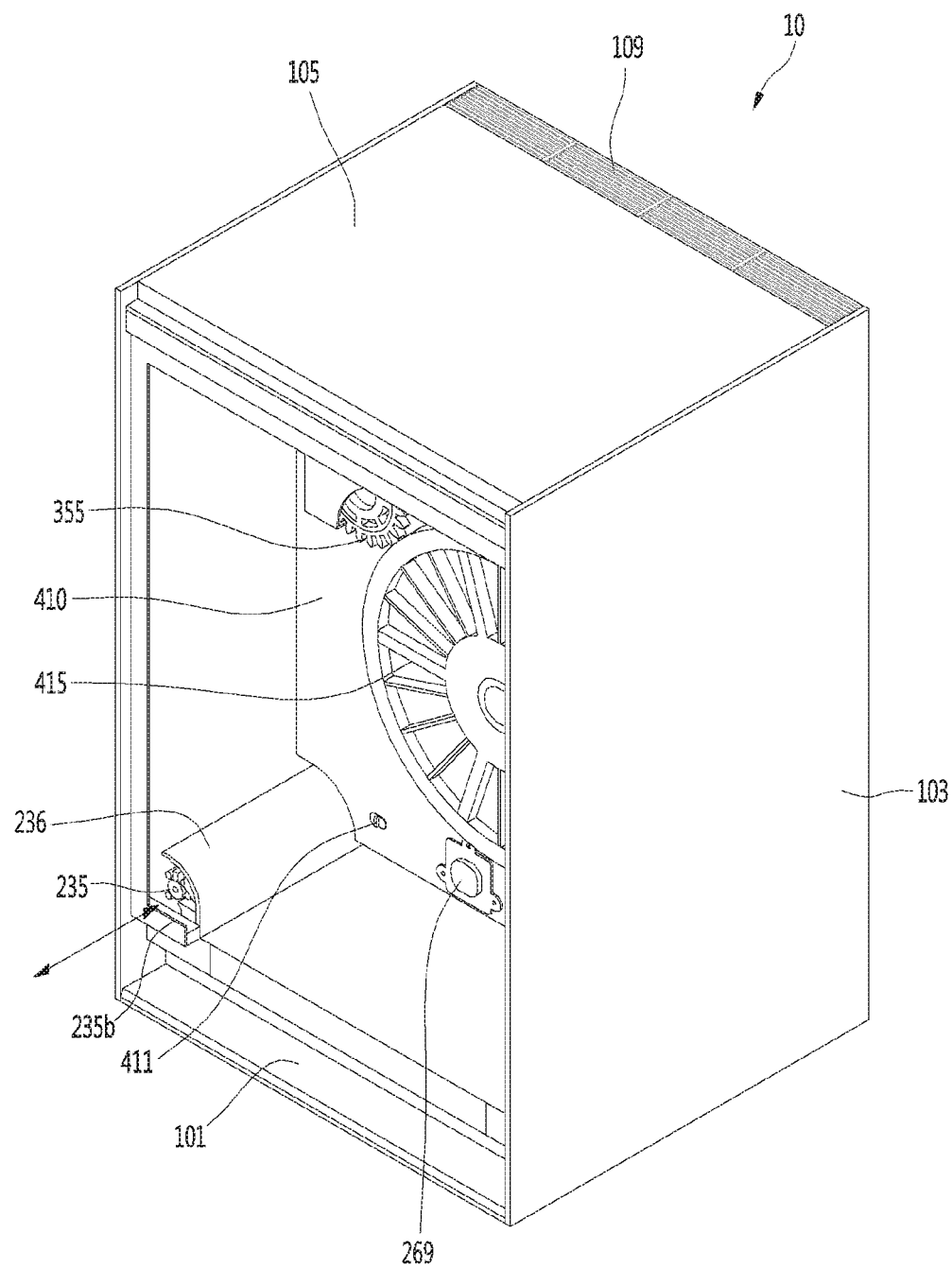
FIG. 13 is a view illustrating an internal structure of a cabinet according to an embodiment of the present invention.

The fan housing 410 includes a fan intake 415 (see FIG. 13). The fan intake 415 may include an intake guide rib extending radially or circumferentially. By the suction guide rib, the user's hand can be prevented from being introduced into the air blowing fan 480.

The humidifying air purifier 10 further includes an electric unit 450 having a plurality of electric components. The electric unit 450 further includes an electric plate 451 covering the opened upper portion of the body frame 110 and the electric component 453 may be installed on the upper surface of the electric component plate 451.

In other words, the cabinets 100 include an air conditioning space in which an air filter 285 and the air blowing fan 480 are installed, and an electric space in which electric components are installed. The air conditioning space and the electric space are vertically partitioned by the electric plate 451. In other words, the electric space may be positioned above the electric plate 451, and the air conditioning space may be positioned below the electric plate 451.

The electric plate 451 may extend forward from the upper portion of the housing assembly 400. The upper panel 105 is coupled to the upper side of the electric plate 451 to protect the electric component 453.

The electric unit may further include a display module 452 having the display 108a. The display module 452 may be disposed at a front portion of the electric plate 451. The display 108a may be exposed to the outside through the display groove 108.

Inside the body frame 110, a sliding rail 235 may be installed to guide the operation of drawing the door assembly 200 out and into.

The sliding rails 235 may be disposed on both sides of the lower portion of the body frame 110. The sliding rail may be positioned above the lower end portion 110b of the bar 110a.

Accordingly, since the lower end portion 110b of the bar 110a and the lower end portions 211a and 211b of the sealing frame 211 are closely contacted with each other in the front and rear directions, it is possible to seal the gap (or space) which is formed by the sliding rail 235 and the rail guide 230. Accordingly, it is possible to effectively guide the flow of the air flowing into the intake 225.

The sliding rail 235 may include a body coupling portion 235a coupled to an inner surface of the body frame 110.

A rail cover 236 is disposed outside the sliding rail 235. By the rail cover 236, the sliding rail 235 may not be exposed to the outside.

On both side surfaces of the door assembly 200, a rail guide 230 is provided. The rail guide 230 is coupled to the sliding rail 235 to be capable of being drawn out of or drawn into the sliding rail 235 and can be slid forward and rearward.

In addition, the rail guide 230 or the sliding rail 235 may include a stopper for limiting the forward and rearward travel distance.

In a case where the drawer 220 is drawn out to a maximum extent, the humidifying filter assembly 300 may be positioned on a flat surface formed by the front surface opening of the body frame 110.

In other words, the stopper can set the maximum distance to which the drawer 220 can be drawn out of the cabinet. The stopper may determine the maximum distance to which the drawer 220 can be drawn out of the cabinet according to the position of the humidifying filter assembly 300.

The body frame 110 further includes an illumination bracket 116 on which a lighting device is installed. The illumination bracket 116 may be disposed below the body frame 110 and may be spaced apart from the first base 101. The illumination bracket 116 may be disposed to face the first base 101.

The body frame 110 further includes a base connecting portion 115 extending upward from the first base 101.

It can be understood that the base connecting portion 115 extends downward from the rear portion of the illumination bracket 116 toward the first base 101.

The recessed portion 30 may form a space between the first base 101 and the illumination bracket 116. The base connecting portion 115 may shield the rear side of the recessed portion 30.

In addition, as described above, the recessed portion 30 can be understood as a space defined by the first base 101, the base connecting portion 115, and the illumination bracket 116.

The body frame 110 further includes a second base 113 extending rearward from the base connecting portion 115 and supporting the drawer 220. The second base 113 forms a flat surface and can support the door lower surface portion 224 of the drawer 220. The first and second bases 101 and 113 may be collectively be referred to as "bases".

The body frame 110 may have a configuration which is stepped upward from the front portion toward the rear side, by the configuration of the first base 101, the base connecting portion 115 and the second base 113. Since the door assembly 200 is supported by the second base 113 and is drawn out or drawn into the cabinet 100, the lower portion of the door assembly 200 is spaced upward from the first base 101, and the space constitutes a recessed portion 30 and thus can communicate with the intake 225.

The illumination device includes an illumination PCB 122 having an illumination source 122a and an illumination case 124 coupled to the illumination PCB 122. A plurality of the illumination sources 122a may be provided, and the plurality of illumination sources 122a may be arranged in the left and right direction.

The illumination case 124 includes a partitioning rib 124b which partitions an inner space of the illumination case 124 into a plurality of spaces 124a, and illumination sources 122a may be disposed in the plurality of spaces 124a, respectively. The illumination source 122a may be coupled to one surface of the illumination PCB 122 and configured to emit light downward. For example, the illumination source 122a may be installed on a bottom surface or a front surface of the illumination PCB 122.

A reflection plate 120 may be provided on the upper surface of the first base 101. The reflection plate 120 is positioned below the plurality of illumination sources 122a and may be provided to gently reflect or diffuse light emitted from the illumination source 122a. The illumination source 122a is disposed on the upper side of the reflection plate 120 and irradiates light toward the reflection plate 120 downward. The recessed portion 30 may be formed between the illumination source and the reflection plate 120.

According to the light irradiated by the illumination source 122a, the humidifying air purifier 1 can provide a gentle light to a region where the recessed portion 30 or the air intake 225 is positioned. Therefore. The illumination device may also be referred to as mood illumination.

A human body detection sensor may be installed on the front surface of the illumination case 124. The human body detection sensor can sense a human body approaching in a direction of the door panel 210. For example, when the human body detection sensor senses a human body approaching the humidifying air purifier 1, the illumination device can be operated to adjust the brightness of the illumination source 122a.

Figure 8:
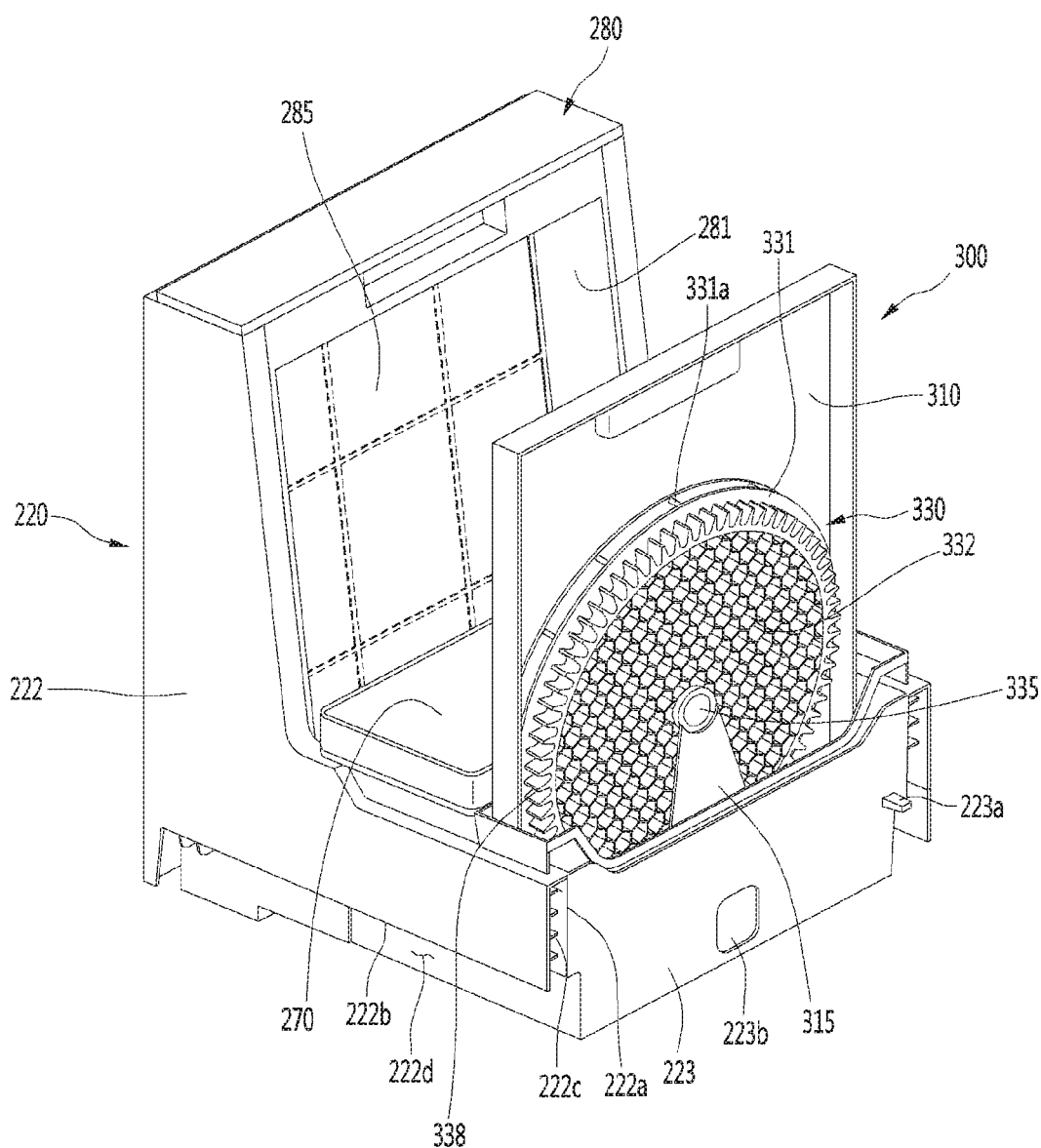
FIG. 8 is a view illustrating a state where an air filter and a humidifying filter are disposed in a door according to an embodiment of the present invention.
Figure 9:
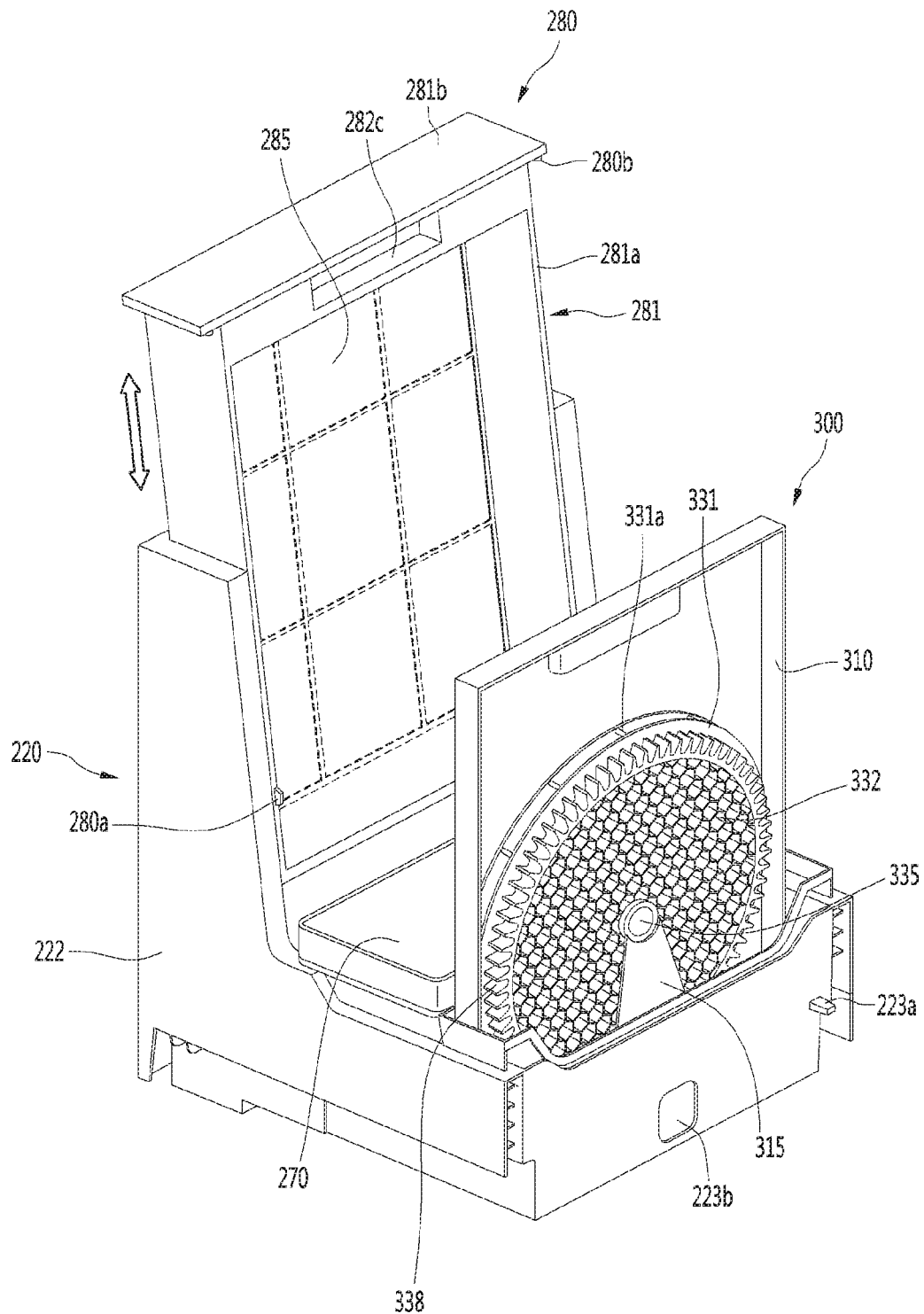
FIG. 9 is a view illustrating a state where an air filter disposed in a door according to an embodiment of the present invention is separated.
Figure 10:
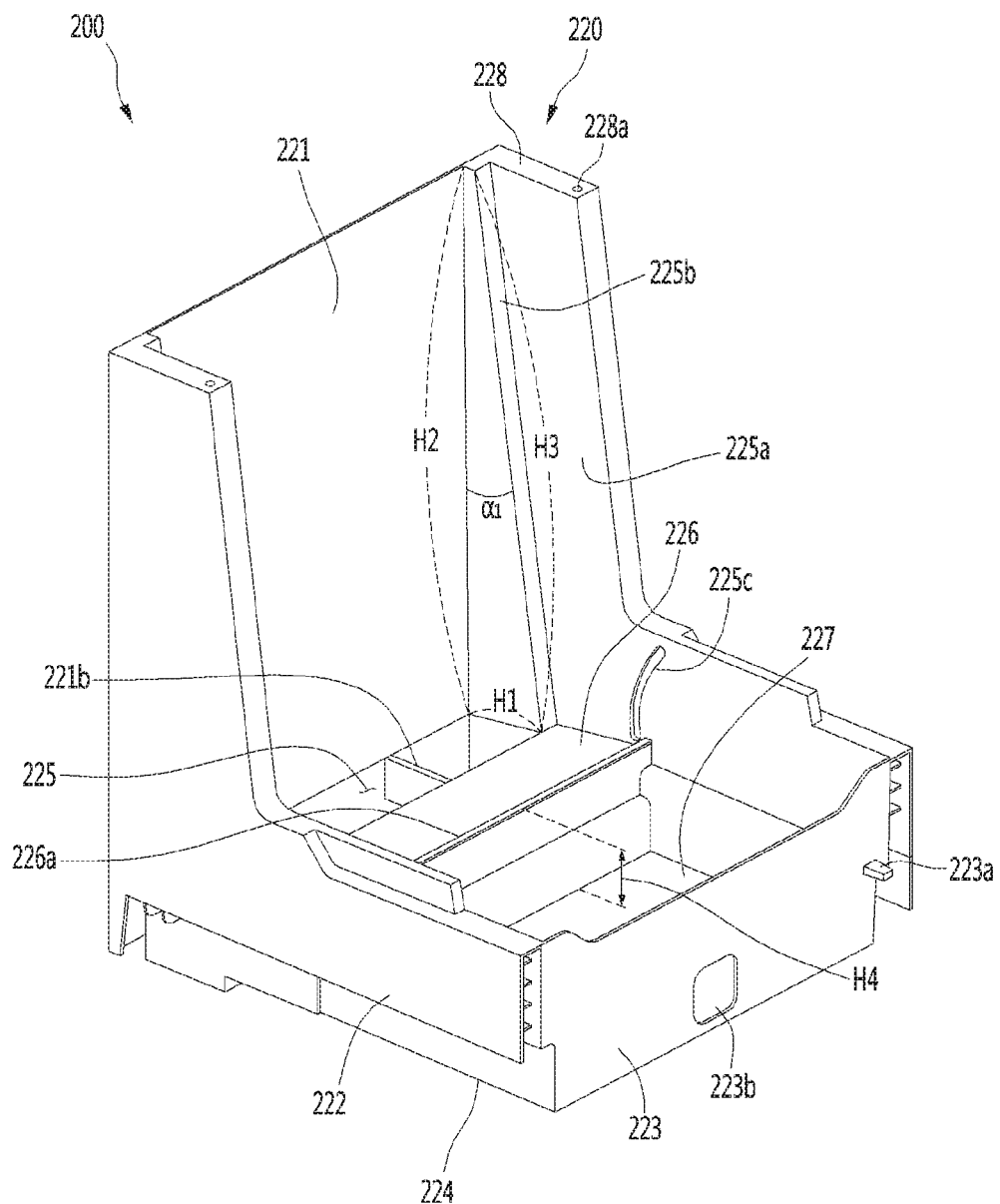
FIG. 10 is a perspective view illustrating a construction of the door according to an embodiment of the present invention.
Figure 11:
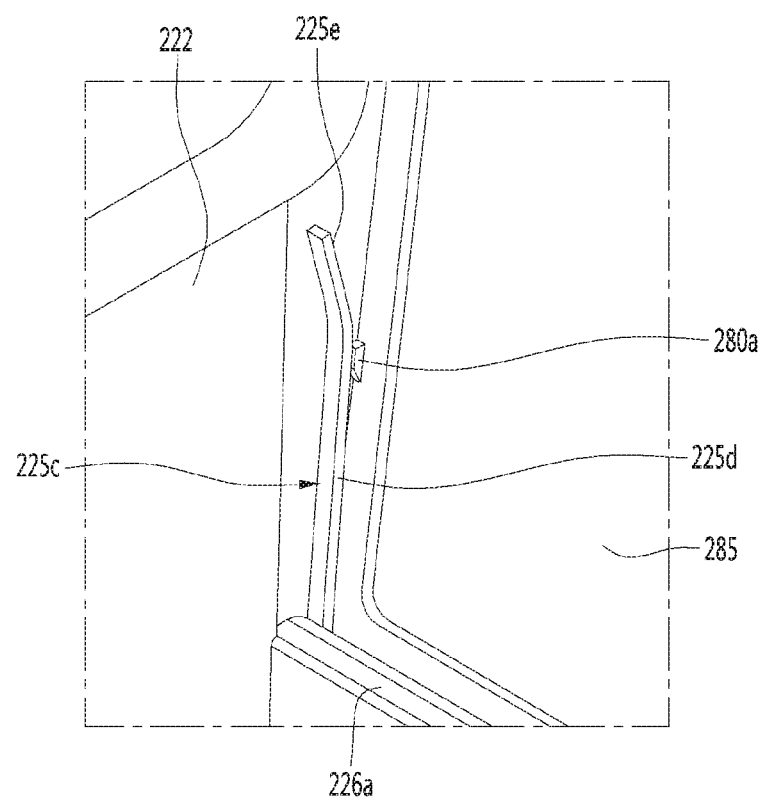
FIG. 11 is a view illustrating a configuration for guiding mounting of an air filter according to an embodiment of the present invention.
Figure 12:
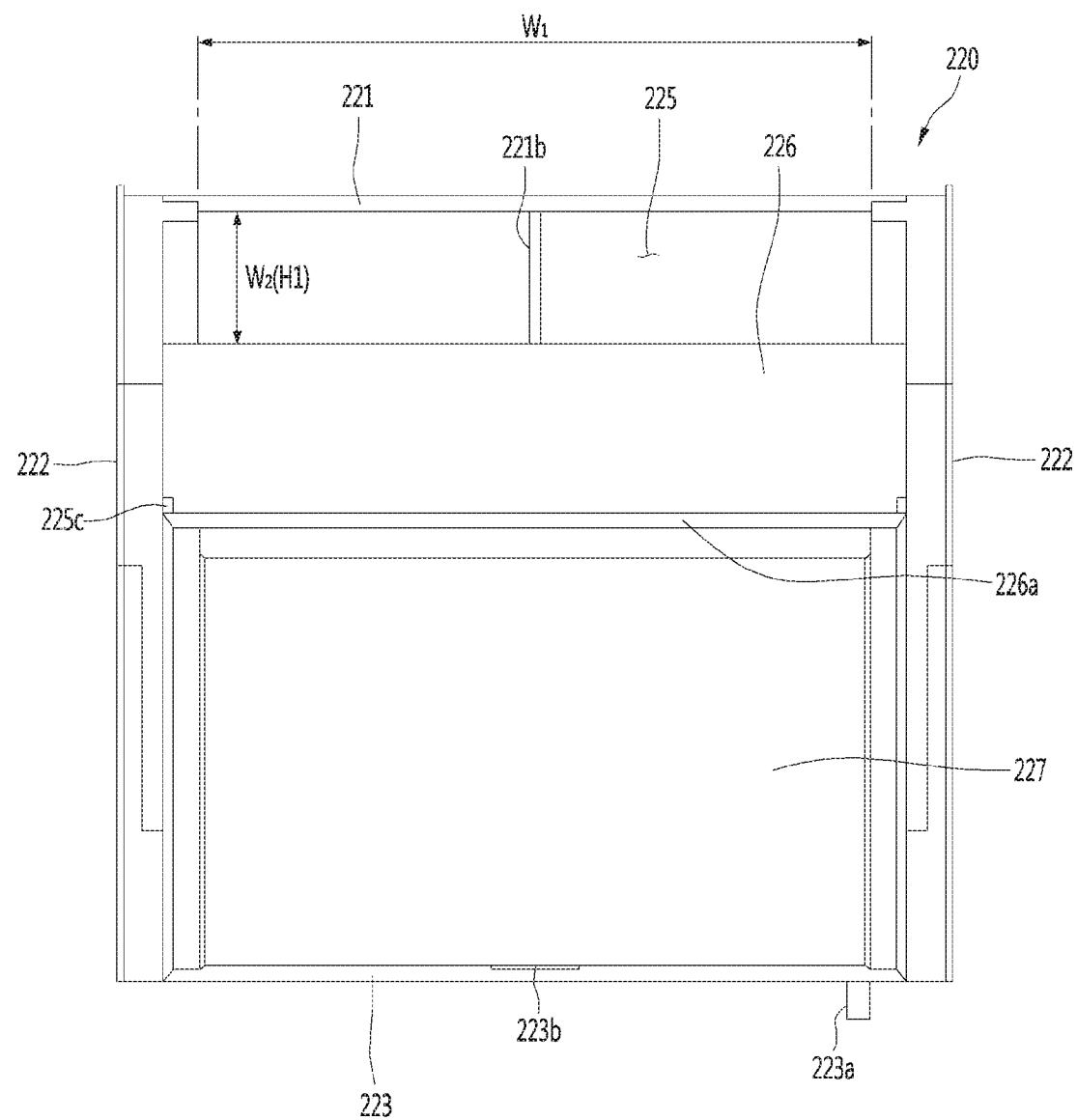
FIG. 12 is a plan view illustrating a configuration of the door according to an embodiment of the present invention.

FIG. 8 is a view illustrating a state where an air filter and a humidifying filter are disposed on a door according to an embodiment of the present invention, FIG. 9 is a view illustrating a state where an air filter disposed in a door according to an embodiment of the present invention is separated FIG. 10 is a perspective view illustrating a construction of a door according to an embodiment of the present invention, FIG. 11 is a view illustrating a configuration for guiding the mounting of an air filter according to an embodiment of the present invention, FIG. 12 is a plan view illustrating a configuration of the door according to an embodiment of the present invention, and FIG. 13 is a view illustrating an internal structure of a cabinet according to an embodiment of the present invention.

Referring to FIG. 8 to FIG. 13, the door assembly 200 includes a drawer 220 coupled to the rear side of the door panel 210, as described above.

The drawer 220 may be provided to be drawn out of the cabinet in a forward direction and drawn into the cabinet in a rearward direction. In other words, the drawer 220 may be provided in a similar configuration to a drawer of furniture.

The drawer 220 may include an air filter assembly 280, a humidifying filter assembly 300, a water container 270, and a water tub 260.

As described above, the drawer 220 is provided with a front surface 221, both side surfaces 222 extending rearward from both side ends of the front surface 221, a bottom surface 224 extending to be connected to the lower end portion of the both side surface 222 and forms a space 225 spaced in the front and rear direction together with the front surface 2221, and a rear surface 223 connecting the rear end of the bottom surface 224 and the rear end of the both side surfaces 222.

The both side surfaces 222 may extend to be inclined so that the height decreases toward the rear side. The rear end of the both side surfaces 222 and the rear surface 223 may extend upward to be lower than the height of the front surface 221.

As described above, the bottom surface 224 of the drawer forming the base surface at the lower portion of the drawer 220 may be referred to as a door lower surface portion 224.

Also, the front surface 221 of the drawer may be referred to as a door front surface portion 221.

The door lower surface portion 224 is formed with an intake 225 through which air is sucked. The intake 225 may be positioned on the rear side of the door front surface portion 221. For example, the intake 225 may be formed through at least a portion of the door lower surface portion 224.

The intake 225 may have a width W1 in the left and right direction larger than a width W2 in the front and rear direction. The width W1 in the left and right direction may have a size corresponding to the width of the air filter assembly 280 in the lateral direction.

The air outside the humidifying air purifier 10 can be sucked into the intake 225 via the recessed portion 30. Then, the sucked air flows upward and can be purified while passing through the air filter 285.

The door lower surface portion 224 includes an air filter seating portion 226 on which the air filter assembly 280 is seated.

The air filter seating portion 226 may be referred to as an air filter seating surface. The intake 225 may be defined as an opening formed from the front end of the air filter seating portion 226 to the front surface 221 of the drawer 220.

The air filter seating portion 226 can be positioned on the rear side of the air intake 225. Since the bottom surface of the air filter assembly 280 is seated on the air filter seating portion 226, the air filter seating portion 226 may be formed as a flat surface corresponding to the bottom surface of the assembly 280.

The air filter seating portion 226 may be provided with a jaw 226a for supporting the air filter assembly 280 from the rear side.

The jaw 226a may protrude upward from the rear edge of the air filter seating portion 226. The jaw 226a may be referred to as "rear support jaw".

The door lower surface portion 224 further includes a seating surface 227 on which the water tub 260 is placed. The seating surface on which the water tub 260 is placed may be referred to as a water tub seating portion 227 or a water tub seating surface.

In addition, the air filter seating portion 226 and the water tub seating portion 227 may be collectively referred to as "seating portion" or "seating surface".

The water tub seating portion 227 may be formed at a lower position than the air filter seating portion 226. For example, the bottom surface 224 of the drawer 220 may be formed with a water tub seating portion 225 which is recessed downward from the air filter seating portion 226 to the rear side of the air filter seating portion 226. In addition, the bottom surface of the water tub seating portion 227 may be formed in a flat name.

Accordingly, when the water tub 260 is seated in the water tub seating portion 227, since the water tub 260 is disposed at a position lower than the air filter assembly 280, the water tub may not interfere with the flow of the air, and the stored water cannot be prevented from splashing into the flow path of the air.

Meanwhile, the jaw 226a can partition an internal space of the drawer 220 into an air purification space in which the air filter assembly 280 is installed and an air humidification space in which the water tub 260 is installed.

In the air humidification space, the water supplied from the water container 270 is stored in the water storage units 229a and 229b, and the stored water is pumped up by the rotation operation of the humidifying filter assembly 300 and a humidification process of humidifying the air is performed.

If the water flowing by the humidifying process is splashed or flows into the air purifying space, the indoor space provided with the humidifying air purifier 1 may be contaminated through the intake 225. In addition, the air purification performance of the air filter assembly 280 can be reduced.

Therefore, the jaw 226a may perform a breakwater function of preventing water from splashing from the air humidification space into the air purifying space. In other words, the jaw 226a may extend upward to be higher than the water tub seating portion 227 and the air filter seating portion 226.

The air filter seating portion 226 may be positioned higher than the water tub seating portion 227. The upper end of the jaw 226a may be positioned higher than the bottom surface of the water tub seating portion 227 by a predetermined height H4.

In other words, the jaw 226a may extend upward from the water tub seating portion 227 by a predetermined height H4.

Here, the predetermined height H4 may be set to be larger than the maximum height of the water tub 260. For example, the maximum height of the water tub 260 may be defined as a distance from a bottom surface of the water tub 260 defining the water storage portions 229a and 229b to an uppermost end of a water container support portion 261 forming an outer appearance of the water tub 260.

In other words, the predetermined height h4 may be set to be larger than the vertical distance from the lowermost end to the uppermost end of the water tub 260. Accordingly, the jaw 226a can prevent the inflow of water into the air purification space from the water storage portion positioned in the water tub seating portion 227.

The intake 225, the air filter seating portion 226, and the water tub seating portion 227 may be aligned in the front and rear direction in the drawer 220 in turn. Therefore, the air sucked in the intake 225 flows rearward and passes through the air filter 285 and the humidifying filter 330, so that the flow performance can be improved.

In addition, the air flowing into the lower end of the door panel 210 by the intake 225 formed in the front area of the bottom surface of the drawer 220 can have a flow flowing through the intake 225 to the upper side.

The air which has passed through the intake 225 passes through the air filter assembly 280 which is seated in the air filter seating portion 226 and the humidifying device filter assembly 300 which is seated in the water tub seating portion 228 in turn and thus can perform air purification and air humidification.

Here, since the air filter assembly 280 and the humidifying filter assembly 300 are inserted from the upper side of the drawer 220, a region (or area) into which air flows may be formed in the air filter seating portion 226 and the water tub seating portion 227 relatively in a perpendicular direction or a longitudinal direction.

In other words, the flow path of the air which passes through the intake 225 and is directed upward may be bent laterally and thus the air passes through the air filter 285 and the humidifying filter 330.

Therefore, the humidifying air purifier 1 according to the embodiment of the present invention due to the above-described air flow path can be installed so that the upper ends of the air filter 285 and/or the humidifying filter 330 are inclined forward than the lower ends thereof. Accordingly, the air purification effect and the air humidification effect can be improved.

In other words, the air filter assembly 280 may be inserted diagonally into the drawer 220. Accordingly, the intake area of the air in the above-described flow path of the air can be maximally improved.

Specifically, the air filter assembly 280 may have a lower end positioned at a rear end of the intake 225 and an upper end positioned at an upper end of the door front surface portion 221.

At this time, the length from the lower end to the upper end of the air filter assembly 280 may be longer than the length from the upper end of the door front surface portion 221 to the front end of the inlet 225 and/or the length from the front end of the intake 225 to the lower end of the air filter assembly 280.

The length H3 from the lower end to the upper end of the air filter assembly 280 may be formed to be greater than at least of the first length H1 from the front end to the lower end of the air intake 225 and a second length H2 from the front end of the intake 225 to the upper end of the door front surface portion.

Hereinafter, the installation structure for maximizing the intake area and fixing and supporting the air filter 285 simply and stable due to the position and the shape of the intake 225 will be described in detail.

The door side surface portion 222 includes a filter guide 225a for supporting both side surface portions of the air filter assembly 280.

The filter guide 225a may extend obliquely upward from both side ends of the air filter seating portion 226. The filter guide 225a may extend forwardly from the lower portion toward the upper portion by inclining at a predetermined angle α1.

In other words, the filter guide 225a may extend obliquely rearward toward the door lower surface portion 224. Accordingly, the air filter assembly 280 may be disposed so as to be inclined obliquely forward in a case where the air filter assembly 280 is seated in the air filter seating portion 226.

Accordingly, the user can easily lift the air filter assembly 280 upward. Accordingly, the filter guide 225a can facilitate the separation of the air filter assembly 280 from the drawer 220.

In addition, the door side surface portion 222 further includes a filter support portion 225b extending in both side directions of the filter guide 225a and supporting both side ends of the front surface of the air filter assembly 280.

The filter support portion 225b may extend by a predetermined length from the front portion of the filter guide 225a in the left and right direction (or both side directions). The predetermined length may be set to a length which does not interfere with the air filter 285 of the air filter assembly 280.

The filter support portion 225b may support a portion of the front surface of the air filter assembly 280. In other words, the filter support portion 225b can function as "front support jaw" which supports the air filter assembly 280 so as not to fall forward in a state where the air filter assembly 280 is disposed to be inclined.

The filter support portion 225b may also extend forward from the lower end toward the upper end by an inclination of the predetermined angle α1. In other words, the hypotenuse of the filter support portion 225b, which will be described later, may extend to be inclined rearwardly as it goes from the upper end to the lower end by the predetermined angle α1.

In other words, the angle formed by the filter support portion 225b and the door front surface portion 221 forms the predetermined angle α1. The predetermined angle α1 forms an acute angle, and may be formed in a range of 5 to 45 degrees, for example.

Therefore, a portion of the front surface, both side surfaces, and the upper ends of both side surfaces of the air filter assembly 280 is supported by the filter guide 225a and the filter support portion 225b so that the air filter assembly 280 can be stably fixed even if the air filter assembly is disposed to be inclined forward.

Meanwhile, the length of the surface of the filter support portion 225b supporting the front of the air filter assembly 280 may form as a length corresponding to the length of the front surface of the air filter assembly 280 in the vertical direction. For example, the vertical length of the air filter 285 may be equal to the length of the side supported by the filter support portion 225b.

In detail, the filter support portion 225b has a lower end formed at the front end of the air filter seating portion 226 and an upper end formed at the upper end of the door front surface portion 221. In other words, the filter support portion 225b may extend from the front end of the air filter seating portion 226 to the upper end of the door front surface portion 221 so as to be inclined forward. Accordingly, the intake 225 may be positioned at the lower end of the filter support portion 225b.

Here, the width H1 of the intake 225 may be defined as a distance between the front end of the air filter seating portion 226 and the rear surface of the door front surface portion 221. In other words, the length H1 of the base of the filter support portion 225b may be defined as the width H1 of the intake 225. The length of the base of the filter support portion 225b may be referred to as a first length H1.

In addition, the length H2 of an edge where the filter support portion 225b and the door front surface portion 221 are in contact with each other can be defined as a length from a point of the door front surface portion 221 which correspond so as to spaced from the lower end of the filter support portion 225b to the front side in the horizontal direction to the upper end of the door front surface portion 221. In this case, the length of the edge of the filter support portion 225b may be referred to as a second length H2.

In addition, the length H3 of the hypotenuse of the filter support portion 225b may be defined as the length H3 from the front end of the air filter seating portion 226 to the upper end of the door front surface portion 221. In this case, the length of the hypotenuse of the filter support portion 225b may be referred to as a third length H3.

The filter support portion 225b may support the front surface of the air filter assembly 280 from the front side. In detail, the filter support portion 225b may support the filter case 281 of the air filter assembly 280. Specifically, the filter support portion 225b can be supported in contact with the front end portion of the first case part 281a, which will be described later.

The front end portion of the first case part 281a may be formed so as to have a length H3 corresponding to the hypotenuse of the filter support portion 225b. Therefore, the front surface of the air filter 285 may be formed as a length H3 corresponding to the hypotenuse of the filter support portion 225b.

The third length H3 may be set longer than the second length H2 and the first length H1.

In other words, the hypotenuse of the filter support portion 225b extends longer than the edge of the filter support portion 225b. Therefore, the air filter 285 may extend longer than the edge of the filter support portion 225b in the vertical direction.

In addition, the edge of the filter support portion 225b may extend longer than the width of the intake 225.

Accordingly, the air filter 285 can be inserted into the drawer 220 in an oblique direction to optimize the intake area of the air.

In addition, by allowing the user to leave the lower end of the separated air filter assembly 280 on the door upper surface portion 228 in a state where the lower end of the separated air filter assembly 280 is inserted into the door upper surface portion 228, the air filter assembly 280 is slid downwardly along the guide of the filter support portion 225b by the gravity. As a result, the air filter assembly 280 can be easily installed.

The side surface of the filter support portion 225b may be formed in a triangular shape. For example, the base of the filter support portion 225b may be perpendicular to the hypotenuse of the filter support portion 225b. In other words, the side surface of the filter support portion 225b may form a right triangle. In this case, the hypotenuse length H2 of the filter support portion 225b may be derived from a known mathematical formula.

The filter guide 225a is provided with a guide rib 225c protruding to guide and support the rear side of the air filter assembly 280.

The guide ribs 225c may be positioned on the rear ends of both sides of the air filter seating portion 226. The guide ribs 225 may extend upward from the air filter seating portion 226 and have an upper portion bent rearward.

The guide rib 225c includes a first part 225d extending upward from the jaw 226a and a second part 225e bent rearward from the upper portion of the first part 225d.

The air filter case 281 is provided with a mounting protrusion 280a which contacts the guide rib 225c. The mounting protrusion 280a may protrude rearward from the air filter case 281. When the air filter 280 is seated on the air filter seating portion 226, the mounting protrusion 280a may contact the front surface of the guide rib 225c.

When the air filter assembly 280 moves downward toward the air filter seating portion 226, the mounting protrusion 280a passes through the front side of the second part 225e, 225d toward the front side of the first part 225d.

At this time, since the second part 225e is bent from the first part 225d, the mounting protrusion 280a is easily moved downward without interfering with the second part 225e, and when the mounting protrusion 280a interferes with the first part 225d, mounting of the air filter assembly 280 may be completed. The air filter assembly 280 can be prevented from shaking by the contact between the mounting protrusion 280a and the guide rib 225c.

The door side surface portion 222 further includes an inner plate 222a extending rearward from the filter guide 225a, an outer plate 222b spaced from the outer side of the inner plate 222a, and a plurality of reinforcing ribs 222c extending from the inner plate 222a to the outer plate 222b.

The inner plate 222a forms an inner surface of the door side surface 222 and the outer plate 222b is positioned shorter than the inner plate 222a. Specifically, the upper portion of the outer plate 222b is connected to the upper portion of the inner plate 222a and the lower portion of the outer plate 222b may be positioned higher than the lower portion of the inner plate 222a.

Therefore, a guide installation space 222d which is recessed toward the inner plate 222a is formed below the outer plate 222b. In the guide installation space 222d, the rail guide 230 can be positioned. The rear portion of the rail guide 230 may be coupled to the rear portions of the inner plate 22a and the outer plate 222b.

The rail guide 230 may be movably coupled to a sliding rail 235 provided in the body frame 110.

Meanwhile, the rail guide 230 and the sliding rail 235 may be referred to as rail assemblies.

In addition, the rail guide 230 or the sliding rail 235 may include a stopper for limiting a distance that drawer 220 can be drawn out or drawn into the cabinet 100 in the front and rear direction.

As another example, the body frame 110 may further include a rail holding jaw 235b for forcibly limiting the distance to which the door assembly 200 may be drawn out of the cabinet.

The rail jaw 235b may be spaced forward from the front end of the rail cover 236. For example, the rail holding jaw 235b may be positioned at the lower end portion 110b of the bar 110a of the body frame. More specifically, the rail holding jaw 235b may protrude upward from the lower end portion 110b of the body frame 100a.

The sliding rail 235 or the rail guide 230 may be drawn out forward until the sliding rail 235 or the rail guide 230 comes into contact with the rail holding jaw 235b. Since the rail holding jaw 235b protrudes perpendicular to an advancing direction of the sliding rail 235 or the rail guide 230, the sliding rail 235 or the rail guide 230 holds by the rail holding jaw 235b. Therefore, the rail-holding jaw 235b can limit the distance to which the door assembly 200 can be drawn out of the cabinet.

The rail holding jaw 235b or the stopper (not illustrated) may define a maximum distance to which the door assembly 200 may be drawn out of the cabinet. In detail, the maximum distance to which the door assembly 200 may be drawn out may be set so that the humidifying filter assembly 300 is positioned on a flat surface formed by the front end of the body frame 110.

In other words, in a case where the door assembly 200 is fully drawn out, the front surface of the humidifying filter case 310 and the front surface of the bar 110a of the body frame may be positioned on a flat surface.

Accordingly, in a case where the door assembly 200 is drawn out, the configurations of the humidifying air purifier 1, which need to be managed, that is, the air filter assembly 280, the water container 270, and the humidifying filter assembly 300, can be drawn out together.

In addition, since the humidifying filter assembly 300 is positioned at a position corresponding to the front surface opening of the body frame 110, the user can draw the configurations which need to be managed out toward the operable space at once. In other words, the accessibility to the management components can be improved.

In addition, in a case where the door assembly 200 is drawn out, since the humidifying filter assembly 300 is positioned at the front surface opening of the body frame 110 or the cabinet 100, It is possible to prevent the internal space 112 of the body frame from being exposed to the visual field.

Therefore, even if the door assembly 200 is drawn out to the maximum, it is possible to prevent the user from putting his/her hand into the internal configuration of the cabinet 100. Therefore, the safety of the product can be improved.

Even if the door assembly 200 is drawn out to the maximum extent, the components provided in the internal space 112 are not exposed to the user, so that the outer appearance of the humidifying air purifier 1 can be neatly maintained. This can result in the upgrading of the product because it can satisfy the emotional aspect of the user.

The door rear surface portion 223 is formed with a through-hole 223b through which the sterilizing device 269 is disposed. For example, the sterilizing device 269 may be disposed inside the through-hole 223b or may be disposed on the rear side of the through-hole 223b. The light irradiated from the sterilizing device 269 may be transmitted to the water tub 260 via the through-hole 223b to sterilize the water.

The door assembly 200 further includes a door upper surface portion 228 forming a front upper surface of the drawer 220. The door upper surface portion 228 forms an upper surface of the filter guide 225a and may be provided on both sides of the drawer 220.

The door upper surface portion 228 is formed with a mounting groove 228a which is downwardly recessed and on which the air filter assembly 280 is mounted. The air filter case 281 of the air filter assembly 280 is provided with an insertion protrusion 280b which is inserted into the mounting groove 228a.

In detail, the air filter case 281 is provided with a first case part 281a which slides along the filter guide 225a and which obliquely extends in the vertical direction, and a second case part 281b which is provided on the upper side of the first case part 281a and extends in the left and right direction. The first case part 281a forms a side surface portion of the air filter case 281 and the second case part 281b forms an upper surface portion of the air filter case 281.

The insertion protrusion 280b may be provided on the second case part 281b and protrude downward from the bottom surface of the second case part 281b. When the second case part 281b is seated on the upper surface of the filter guide 225a, the insertion protrusion 280b can be inserted into the mounting groove 228a.

On the upper side of the water tub 260, a water container 270 is disposed. The water container 270 includes a water container main body for storing water and a water container lid 271 detachably coupled to the upper side of the water container main body. The user can separate the water container cover and replenish water inside the water container main body.

When the water container 270 is placed in the water tub 260, the valve device 276 of the water container 270 is opened so that the water stored in the water container 270 can flow into the first water storage portion 229a.

The humidifying filter assembly 300 may be installed in the water tub 260. The humidifying filter assembly 300 may be disposed on the rear side of the water container 270 and the lower portion of the humidifying filter assembly 300 may be disposed to be submerged in the second storage portion 229b.

The humidifying filter assembly 300 includes a humidifying filter case 310 having a shaft support portion 315 and a humidifying filter 330 having a central shaft 335 supported by the shaft support portion 315. The central shaft 335 of the humidifying filter 330 may be rotated clockwise or counterclockwise while being supported by the shaft support 315.

The humidifying filter 330 includes a collecting rib 331a for pumping water stored in the second water storage portion 229b of the water tub 260. The water pumped from the collecting rib 331a moves upward in a process in which the humidifying filter is rotated and may flow downward into the humidifying filter 330 when the water moves downward again. The water flowing downward into the humidifying filter 330 can permeate the filter medium 332.

The humidifying air purifier 10 further includes a humidifying filter motor 353 (see FIG. 7) and a humidifying filter driving gear 355 which is coupled to the humidifying filter motor 353 and rotates, as driving devices for rotating the humidifying filter 330. The humidifying filter motor 353 and the humidifying filter driving gear 355 may be installed in the fan housing 410.

The humidifying filter 330 includes a filter gear 338 interlocked with the humidifying filter driving gear 355. The filter gear 338 may be provided on the outer surface of the filter medium 332 and may have a plurality of gears. The plurality of gears of the filter medium 332 can be geared with the humidifying filter driving gear 355. When the humidifying filter motor 353 is driven, the filter gear 338 can rotate clockwise or counterclockwise in association with the humidifying filter driving gear 355.

A contact portion 411 is provided on the front surface of the fan housing 410. The door rear surface portion 223 is provided with a contact protrusion 223a for switching operation on the contact portion 411. The contact protrusion 223a may protrude rearward from the door rear surface portion 223.

When the door 200 is closed, it can be recognized that the door 200 is closed, by the contact protrusion 223a contacting the contact portion 411 or the contact protrusion 223a closing to the contact portion 411 within a predetermined distance. The fan motor 485 or the humidifying filter motor 353 can be driven only when the door 200 is recognized as being closed. Thus, the use stability can be improved.

Figure 14:
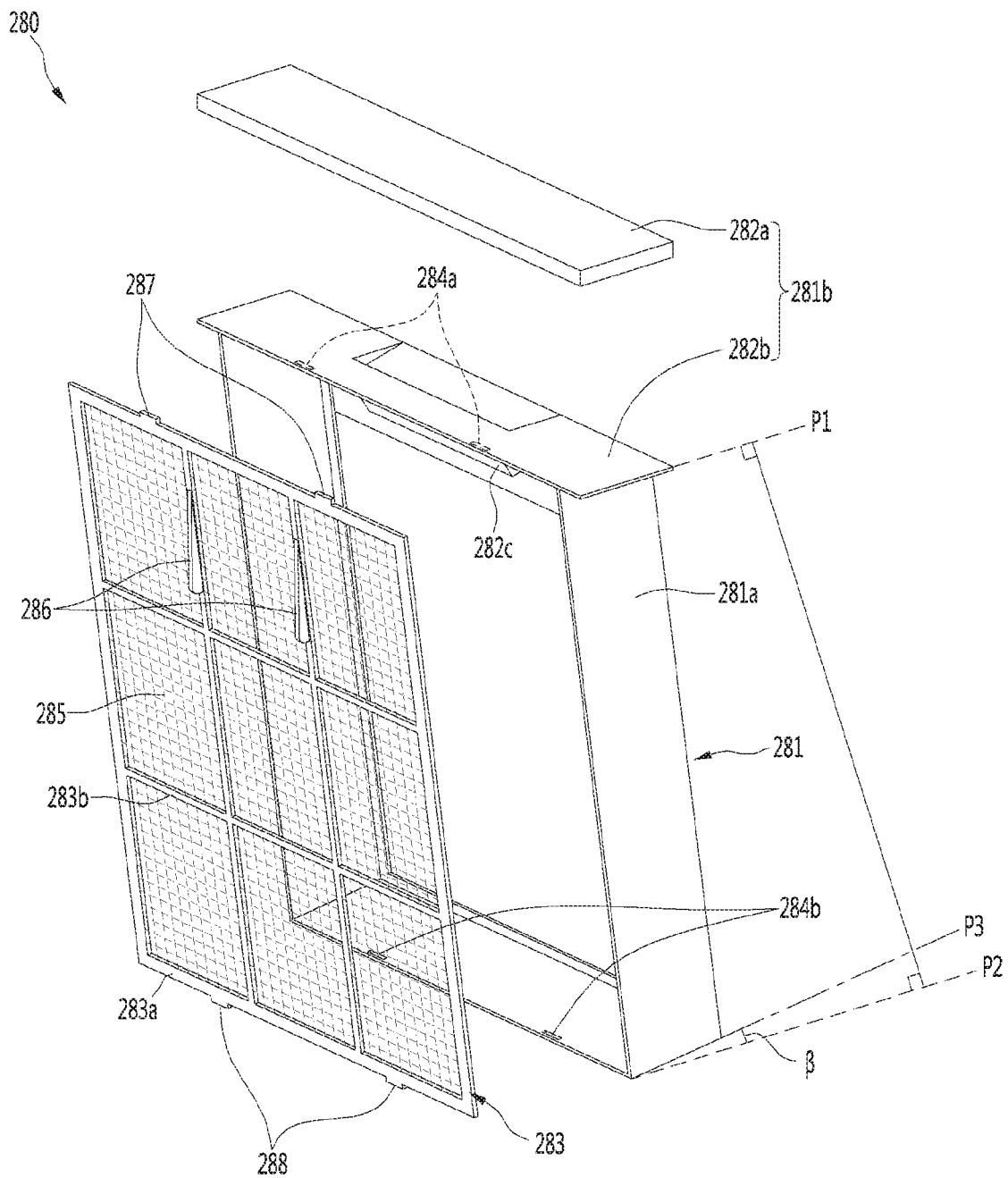
FIG. 14 is an exploded view illustrating a configuration of an air filter assembly according to an embodiment of the present invention.
Figure 15:
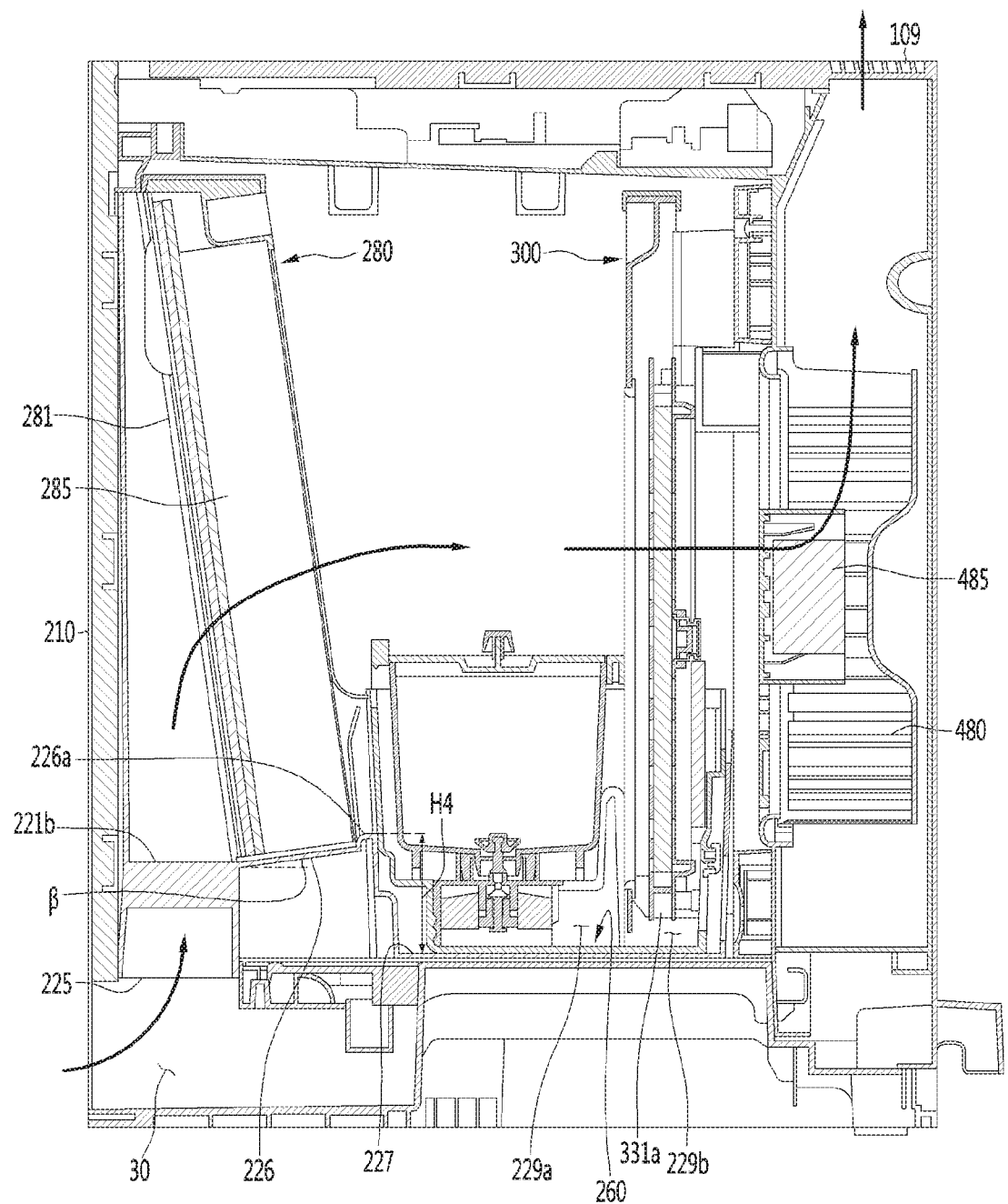
FIG. 15 is a sectional view illustrating air flow in a humidifying air purifier according to an embodiment of the present invention.

FIG. 14 is an exploded view illustrating a configuration of an air filter assembly according to an embodiment of the present invention, and FIG. 15 is a sectional view illustrating an air flow in a humidifying air purifier according to an embodiment of the present invention.

Referring to FIG. 14 and FIG. 15, the air filter assembly 280 may include an air filter case 281 having a first case part 281a and a second case part 281b, a filter mounting portion 283 coupled to the air filter case 281, and an air filter 285 coupled to the filter mounting portion 283.

Hereinafter, the air filter case 281 may be referred to as a filter case 281 for convenience of explanation.

The filter case 281 may be formed to have a rectangular shape with its sides inclined. For example, the side surface of the filter case 281 may be formed in a parallelogram shape.

The side surface of the filter case 281 can be understood as the first case part 281a and the upper surface of the filter case 281 can be understood as the second case part 281b.

The second case part 281b includes a filter guide seating portion 282b provided on the upper portion of the first case part 281a and a filter cover 282a coupled to the upper surface of the filter guide seating portion 282b. The filter cover 282a may be provided in a board shape in which a flat surface is formed.

The filter case 281 may configured so that the front surface and the rear surface thereof are opened and have a shape corresponding to the air filter seating portion 226 and the filter guide 225a. For example, the filter case 281 may have a hexahedron shape which is opened in the front and rear direction.

The lower surface of the filter case 281 may be seated on the air filter seating portion 226 and may have a shape corresponding to the air filter seating portion 226. For example, the lower surface of the filter case 281 may be formed as a flat surface.

Accordingly, the air filter assembly 280 may be detached from the drawer 220 and laid to stand on a flat ground surface. Accordingly, the manageability of the air filter assembly can be improved.

Meanwhile, in a case where the lower surface of the filter case 281 abuts against the ground surface and the air filter assembly 280 stands up, the upper surface of the filter case 281 may be formed to be inclined upward toward the front side.

In detail, a virtual straight line drawn in the extending direction of the edge formed by the upper surface and the side surface of the filter case 281 can be defined as a first parallel line P1. A virtual straight line drawn parallel to the first parallel line P2 from the front end of the edge formed by the lower surface and the side surface of the filter case 281 may be defined as a second parallel line P2.

The first parallel line P1 and the second parallel line P2 are parallel to each other.

In addition, a virtual straight line drawn in the extending direction of the edge formed by the lower surface and the side surface of the filter case 281 may be defined as an inclined line P3.

The inclined line P3 has a predetermined inclination angle $\beta$ from the second parallel line P2. For example, the inclination angle $\beta$ may be set to an acute angle.

In other words, the upper surface of the filter case 281 may extend downwardly with respect to the lower surface of the filter case 281 to have the inclination angle 3. Specifically, the upper surface of the filter case 281 may be formed as an inclined surface more inclined downward by the inclination angle $\beta$ toward the rear end than the lower surface of the filter case 281.

In addition, the lower surface of the filter case 281 may extend upward with respect to the upper surface of the filter case 281 so as to have the inclination angle $\beta$. Specifically, the lower surface of the filter case 281 may be formed as an inclined surface which is inclined upward toward the rear end than the upper surface of the filter case 281.

In other words, the extension lines of the upper surface and the lower surface of the filter case 281 are not parallel to each other and can meet at any virtual point.

In addition, the air filter seating portion 226 can form an upper surface inclined upward toward the rear end. Here, the inclination angle $\beta$ formed by the upper surface of the air filter seating portion 226 may be the same as the inclination angle $\beta$ of the filter case 281 described above.

Accordingly, the lower end portion of the air filter assembly 280 may be formed to have a 'V' shaped longitudinal section, for example. side surface in which the filter support portion 225b and the air filter seating portion 226 are connected to each other may form a 'V' shape. Accordingly, the lower end portion of the air filter assembly 280 can be fitted to the edge where the filter support portion 225b and the air filter seating portion 226 are connected to each other.

As a result, when the user places the air filter assembly 280 on the door upper surface portion 228 and leaves the air filter assembly 280 as it is, the air filter assembly 280 slides downward due to gravity, is fitted into the inclined upper surface of the seating portion 226 and the filter supporting portion 225b, and thus the installation thereof can be easily completed. In other words, user convenience can be improved.

In a case where the air filter assembly 300 is seated on the air filter seating portion 226, the lower edge of the filter case 281 is inclined by the inclination angle $\beta$. Therefore, the upper surface of the filter case 281, that is, the second case part 281b may be horizontally disposed and seated on the door upper surface portion 228.

As a result, according to the air filter assembly 280 and the drawer 220 according to the embodiment of the present invention, there are advantages that it is possible to maximally improve the flow cross-sectional area of the air sucked into the air filter 285 and the filter assembly 280 can be easily separated or installed by the user.

Meanwhile, both side surfaces of the filter case 281, that is, the first case part 281a can extend so as to be inclined forward from the lower surface to the upper portion. In other words, the first case part 281a may be formed to correspond to the filter guide 225a.

The second case part 281b extends to connect the upper portion of the first case part 281a and the upper surface of the second case part 281b extends longer than the distance between the first case parts 281a on both sides. Accordingly, both side portions of the second case part 281b may protrude outward from the first case part 281a and be supported by the door upper surface portion 228. The insertion protrusion 280b may be provided on both side portions of the bottom surface of the second case part 281b.

The filter case 281 may further include a handle 282c which can be grasped by the user. The handle 282c may include a recessed groove in the upper portion of the filter case 281. For example, the handle 282c may be recessed to be inclined downwardly from an upper portion of the rear side of the filter case 281. Therefore, the user's hand can be easily inserted from the rear side of the filter case 281.

The user can grasp the handle 282c together with the filter cover 281 by inserting the user's hand into the handle 282c. As a result, the user has the advantage of easily separating or mounting the air filter assembly 280 in an inclined vertical direction by grasping the handle 282c.

The filter mounting portion 283 may extend in the vertical direction with a length corresponding to the hypotenuse of the filter support portion 225b.

The filter mounting portion 283 may include a plurality of frames 283a and 283b. For example, the filter mounting portion 283 may include an outer frame 283a corresponding to the opened front end portion of the filter case 282 and an inner frame 283b extending in the vertical direction or both side directions from the outer frame. The inner frame 283b may be formed to connect the facing outer frame 283a. The frame may be formed of a material having a relatively high ductility.

Therefore, the frame can be bent by applying the pressure by the user. Accordingly, the user can easily separate the filter mounting portion 283 from the filter case 281 through the filter mounting portion 283 which is bent by pulling the installation rib 286 to be described later.

The air filter 285 may be coupled and stably fixed by the filter mounting portion 283. For example, the air filter 285 is fitted in the frames 283a and 283b, thereby being positioned in a space formed by the frame and purifying the air sucked.

The air filter 285 may include at least one of a prefilter for filtering matters having relatively large particles, a HEPA filter for filtering matters having relatively small particles, and a deodorizing filter for removing odors.

The filter mounting portion 283 and the air filter 285 may be positioned at the open front end portion of the filter case 282. Specifically, the filter mounting portion 283 can be fitted into the filter case 281. To this end, the filter mounting portion 283 may include an upper fixing protrusion 287 and a lower fixing protrusion 288.

A plurality of the upper fixing protrusions 287 may be formed at the upper end portion of the filter mounting portion 282. For example, the upper fixing protrusion 287 may protrude upward from the upper portion of the filter mounting portion 283.

A plurality of the lower fixing protrusions 288 may be formed at the lower end portion of the filter mounting portion 283. For example, the lower fixing protrusion 288 may protrude downward from the lower portion of the filter mounting portion 283.

The filter case 281 may include an upper fixing groove 284a into which the upper fixing protrusion 287 is inserted and a lower fixing groove 284b into which the lower fixing protrusion 288 is inserted.

The upper fixing groove 284a may be formed as a groove recessed inwardly on the upper end surface of the filter case 282. The upper fixing groove 284a may be formed to correspond to the number and positions of the upper fixing protrusions 287. Therefore, the upper fixing protrusion 287 may be inserted into the upper fixing groove 284a to be fitted into the upper fixing groove 284a.

The lower fixing groove 284b may be formed as a groove recessed inwardly on the lower surface of the filter case 281. The lower fixing groove 284b may correspond to the number and positions of the lower fixing protrusions 288. Therefore, the lower fixing protrusion 288 may be inserted into the lower fixing groove 284b to be fitted into the lower fixing groove 284b.

The filter mounting portion 283 may further include an installation rib 286 which can be grasped by the user. The mounting rib 285 may protrude forward from the front surface of the filter mounting portion 283. For example, the installation rib 286 may be formed to protrude forward from the inner frame front surface of the filter mounting portion 283.

In addition, the installation ribs 286 may be provided so as to be symmetrical to each other with respect to a plurality of inner frame front surfaces. In other words, a pair of the installation ribs 286 may be provided. Accordingly, the user can front surface grasp the installation ribs 286, respectively and easily mount the filter mounting portion 283 on the filter case 281 or separate the filter mounting portion 283 from the filter case 281.

Since the installation rib 286 extends forward from the front end surface of the inner frame, there is an advantage that the installation rib 286 does not shield along the flow direction of the air flowing into through the recessed portion 30 and passing through the air filter 285 and thus and the air passes through the entire intake surface of the air filter 285.

In addition, since the user can grasp the installation rib 286 so that the upper fixing protrusion 287 and the lower fixing protrusion 288 can be easily inserted into the upper fixing groove 284a and the lower fixing groove 284b, the air filter 285 can be easily managed.

Referring to FIG. 15, the air flow in the humidifying air purifier according to the embodiment of the present invention will be briefly described.

When the air blowing fan 480 is driven, air outside the air purifier can be sucked into the air intake 225 via the recessed portion 30. The air sucked from the air intake 225 flows upward and flows into the drawer 220.

Then, the air passes through the air filter assembly 280. In a state where the air filter assembly 280 is seated on the air filter seating portion 226, the air filter assembly 280 is inclined forwardly, the air can evenly pass through the filter surface of the air filter assembly 280.

The air filtered in the air filter assembly 280 flows rearward and can pass through the humidifying filter assembly 300. The air is humidified while passing through the humidifying filter assembly 300, and the humidified air can pass through the air blowing fan 480.

Since the air filter assembly 280, the water tub 260, and the humidifying filter assembly 300 are disposed rearward from the front portion of the drawer 220 in turn, air filtering and humidification are facilitated.

The air is sucked in the axial direction of the air blowing fan 480 and can be discharged in the radial direction. The air which has passed through the air blowing fan 480 flows upward and can be discharged to the outside through the discharge portion 109. In other words, since the air is sucked into the front lower portion of the humidifying air purifier 10 and discharged to the rear upper portion, the flow resistance is reduced and the air blowing performance can be improved.

Figure 16:
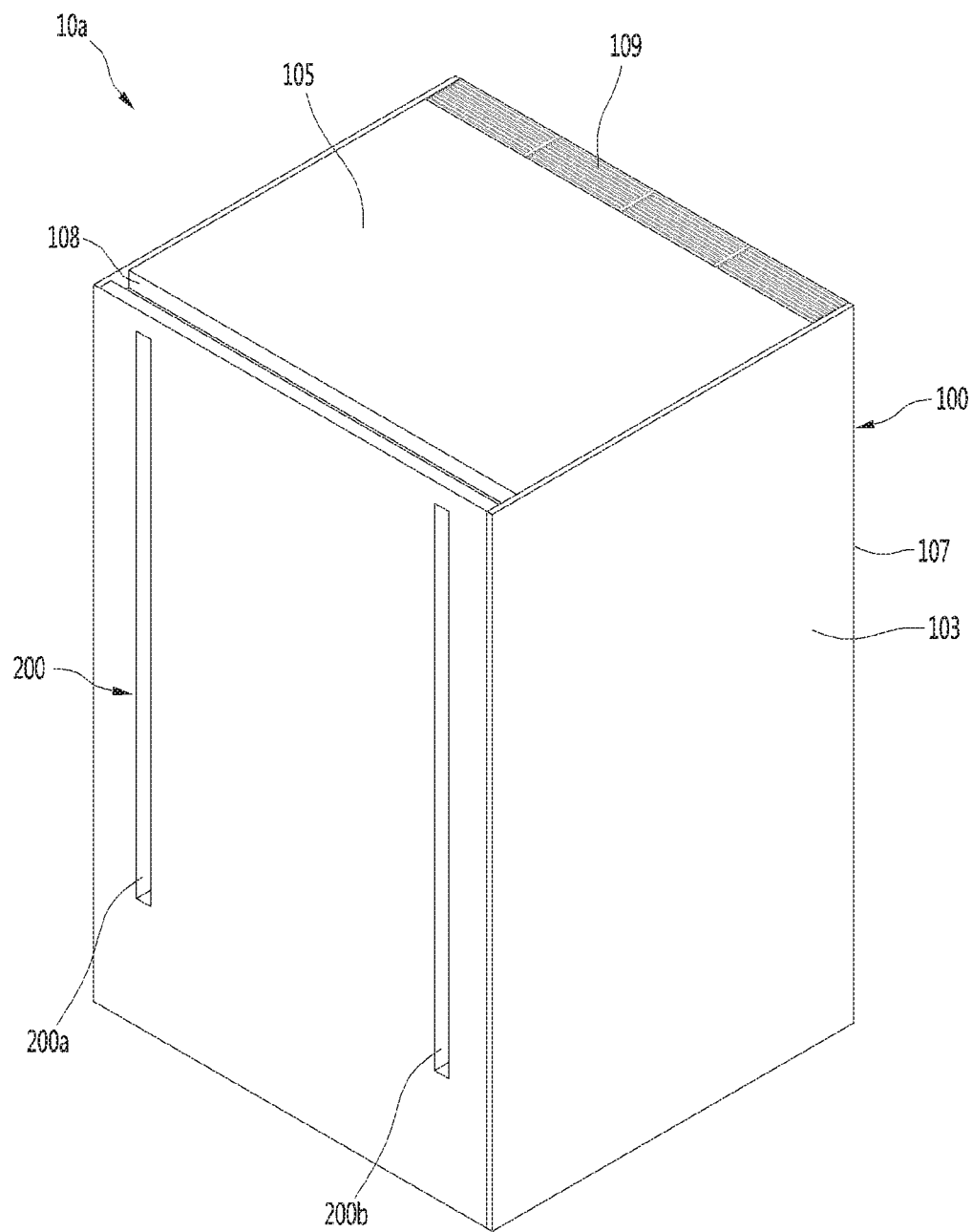
FIG. 16 is a perspective view illustrating a configuration of a humidifying air purifier according to another embodiment of the present invention.
Figure 17:
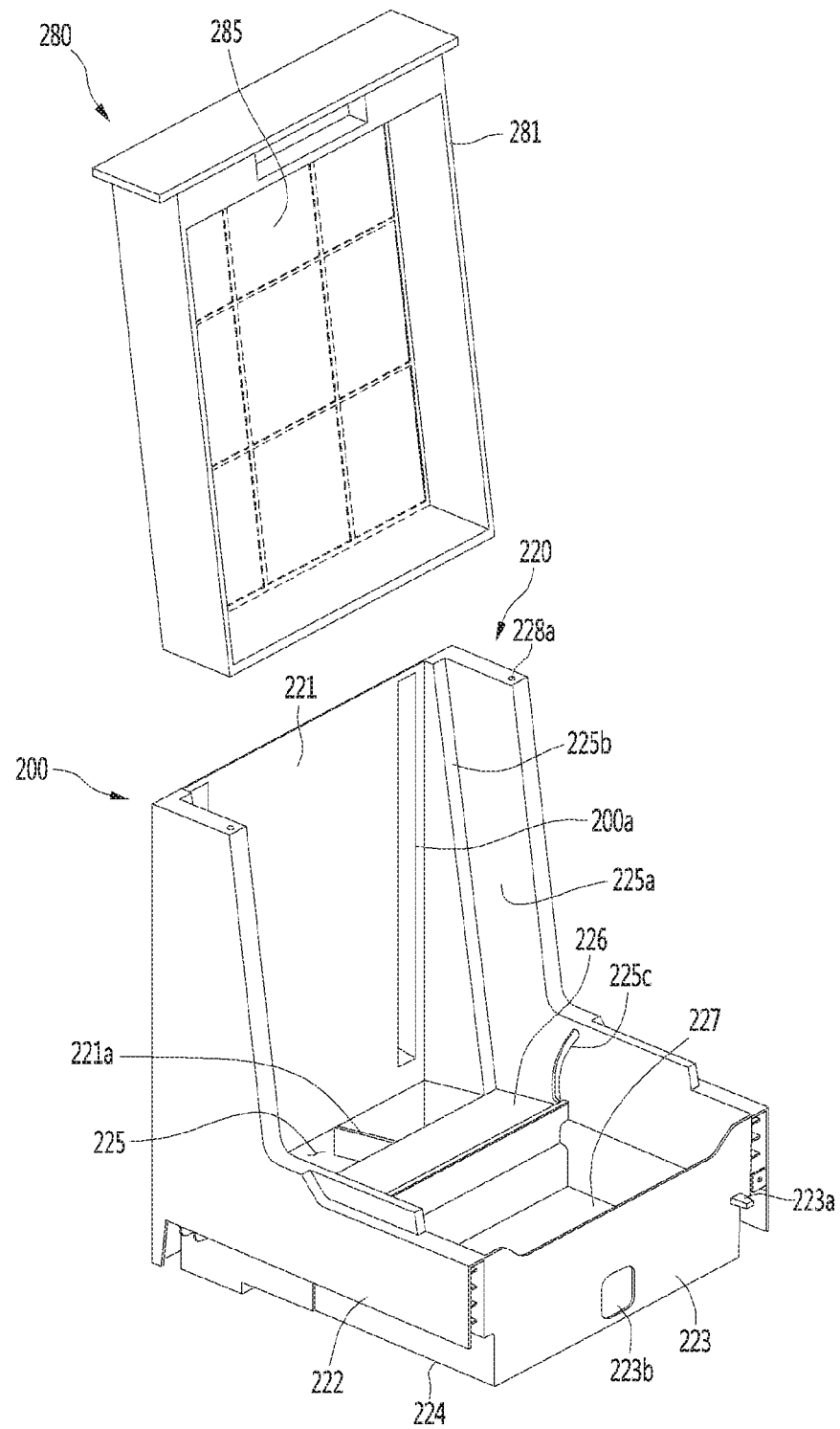
FIG. 17 is an exploded perspective view illustrating configurations of a door and an air filter of the humidifying air purifier according to another embodiment of the present invention.

FIG. 16 is a perspective view illustrating a configuration of a humidifying air purifier according to another embodiment of the present invention, and FIG. 17 is an exploded perspective view illustrating a configuration of a door and an air filter of a humidifying air purifier according to another embodiment of the present invention.

Referring to FIG. 16 and FIG. 17, the humidifying air purifier 10a according to another embodiment of the present invention includes a door 200 in which an air intake unit 200a is formed.

Since the door 200 forms the front surface of the humidifying air purifier 10a, it can be understood that the air intake unit 200a is formed on the front surface of the humidifying air purifier 10a. The air filter assembly 280 may be disposed behind the air intake unit 200a.

Accordingly, the air is sucked from the front side of the door 200 and flows rearward, and is filtered through the filter assembly installed on the door 200, and can pass through the humidifying filter assembly and the air blowing fan. In addition, the air may be discharged to the outside through a discharge portion 109 formed on the rear side of the upper surface of the cabinet 100.

As described in the previous embodiments, the door 200 may be provided to be drawn out to the front of the cabinet 100 or to be drawn into the inner portion of the cabinet 100. The description of the other humidification air purifiers is based on the description of the previous embodiments.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A humidifying air purifier comprising:
   a cabinet forming an entire front as an opening and forming an inner space extending rearward from the opening,
   wherein the cabinet has an air blowing fan disposed in the inner space and a discharge portion formed on a rear part of an upper surface of the cabinet to discharge air discharged from the air blowing fan to outside;
   a door assembly provided to enter or exit the inner space of the cabinet, and accommodating an air filter, a humidifying filter disposed at a rear of the air filter and a water tub in which the humidifying filter is seated; and
   a rail assembly connecting the cabinet and the door assembly and guiding a front-rear movement of the door assembly,
   wherein the door assembly includes:
      a front panel configured to selectively open and close the opening of the cabinet, and formed of wood material;
      a door front surface portion coupled to a rear surface of the front panel;
      a door side surface portion extending rearward from the door front surface portion and supporting the air filter inserted to face the door front surface portion;
      an air intake formed on a bottom surface of the door assembly for introducing air supplied to the air filter, the air intake being disposed at a rear of the front panel and disposed in front of the air filter;
      a panel coupling portion recessed from a front surface of the door front surface portion and extending in a straight direction to couple the door front surface portion with the rear surface of the front panel; and
      a sealing frame coupled to the rear surface of the front panel and having a rectangular shape, the sealing frame being disposed to contact the cabinet to block air leakage in a state of which the door assembly is entered into the cabinet,
   wherein the sealing frame has lower ends spaced apart from each other by a length corresponding to a width of the air intake, and
   wherein the lower ends of the sealing frame define a part of the air intake in a state of which the door assembly is entered into the cabinet.

2. The humidifying air purifier according to claim 1, wherein the front panel has a plurality of wooden grooves engraved in a straight direction on an inner surface of the front panel so as to be positioned above the air intake,
   wherein the cabinet includes a body frame having an opened front surface, a side panel coupled to a side surface of the body frame, and an upper panel coupled to an upper side of the side panel,
   wherein at least one of the side panel, or the upper panel is made of wood material, and
   wherein at least one of the side panel, or the upper panel has a plurality of grooves engraved in a respective inner surface thereof.

3. The humidifying air purifier according to claim 2, wherein at least one of the front panel, the upper panel or the side panel, formed of wood material, is inserted therein with a reinforcing frame formed of a metal material.

4. The humidifying air purifier according to claim 1, wherein the cabinet further includes a base, wherein the base includes a first base, a base connecting portion extending upward from a rear side of the first base, and a second base extending rearward from the base connecting portion, and
   wherein the door assembly is supported by the second base.

5. The humidifying air purifier according to claim 4, wherein, in a space between the first base and the air intake, a recessed portion for guiding air inflow to the air intake is defined.

6. The humidifying air purifier according to claim 5, wherein a lighting device that irradiates light toward the first base is installed in the recessed portion.

7. The humidifying air purifier according to claim 4, wherein the air intake, the air filter and the humidifying filter are sequentially aligned in a direction of the enter and exit of the door assembly.

8. The humidifying air purifier according to claim 7, wherein the air filter, the humidifying filter and the air blowing fan are sequentially aligned in a direction of the enter and exit of the door assembly.

9. The humidifying air purifier according to claim 2, wherein the body frame further includes a bar coupled to front ends of the side surface to define the opened front, and
   wherein the sealing frame is in contact with a front surface of the bar.

10. The humidifying air purifier according to claim 9, wherein when the door assembly is drawn into the body frame, at least two of the outer surfaces of the sealing frame are in contact with at least one of the bar and the side panel so as to seal the opened front surface.

11. The humidifying air purifier according to claim 2, wherein the rail assembly includes:
    a sliding rail installed at lower ends of the body frame; and
    a rail guide installed at lower ends of the door assembly and coupled with the sliding rail.

12. The humidifying air purifier according to claim 1, wherein the lower ends of the sealing frame include a first end portion and a second end portion extending to face each other, and
    wherein the first end portion and the second end portion are spaced apart to form the part of the intake.

13. The humidifying air purifier according to claim 1, further comprising:
    a fastening member coupled to a recessed space of the panel coupling portion and fastened to the rear surface of the front panel.

14. The humidifying air purifier according to claim 1, wherein the panel coupling portion is formed such that a recessed space extends along a vertical direction of the door front surface portion.

15. The humidifying air purifier according to claim 1, wherein the panel coupling portion is provided in a plurality of spaced apart in a width direction of the door front surface portion.

* * * * *